(12) United States Patent
Fukuda

(10) Patent No.: US 10,063,764 B2
(45) Date of Patent: Aug. 28, 2018

(54) CONTROL APPARATUS, IMAGE PICKUP APPARATUS, CONTROL METHOD, AND NON-TRANSITORY COMPUTER-READABLE STORAGE MEDIUM FOR PERFORMING FOCUS DETECTION

(71) Applicant: CANON KABUSHIKI KAISHA, Tokyo (JP)

(72) Inventor: Koichi Fukuda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/223,497

(22) Filed: Jul. 29, 2016

(65) Prior Publication Data

US 2017/0034426 A1    Feb. 2, 2017

(30) Foreign Application Priority Data

Jul. 30, 2015 (JP) ................................ 2015-150774
May 24, 2016 (JP) ................................ 2016-103015

(51) Int. Cl.
*H04N 5/232* (2006.01)
*H04N 5/357* (2011.01)
(Continued)

(52) U.S. Cl.
CPC ....... *H04N 5/23212* (2013.01); *H04N 5/2256* (2013.01); *H04N 5/23293* (2013.01);
(Continued)

(58) Field of Classification Search
CPC ..................... H04N 5/23212; H04N 5/3696
See application file for complete search history.

(56) References Cited

U.S. PATENT DOCUMENTS

| 4,410,804 A | 10/1983 | Stauffer |
| 2004/0207747 A1 | 10/2004 | Ikeda |

(Continued)

FOREIGN PATENT DOCUMENTS

| CN | 102685406 A | 9/2012 |
| CN | 103380392 A | 10/2013 |

(Continued)

OTHER PUBLICATIONS

Search Report for corresponding British Application No. 1613021.3 dated Feb. 1, 2017.

(Continued)

*Primary Examiner* — Paul Berardesca
(74) *Attorney, Agent, or Firm* — Carter, DeLuca, Farrell & Schmidt, LLP

(57) ABSTRACT

A control apparatus (121) includes a generation unit (121*a*) for generating first and second focus detection signals based on a plurality of types of color signals from first and second pixel groups that receive light beams passing through partial pupil regions different from each other, and a calculation unit (121*b*) for calculating a defocus amount by a phase difference detection method by using the first and second focus detection signals, and the generation unit combines the color signals with respect to the first pixel group so that centroids of the color signals in a pupil division direction coincide with each other to generate the first focus detection signal, and combines the color signals with respect to the second pixel group so that centroids of the color signals in the pupil division direction coincide with each other to generate the second focus detection signal.

11 Claims, 13 Drawing Sheets

(51) Int. Cl.
H04N 5/369 (2011.01)
H04N 5/225 (2006.01)

(52) U.S. Cl.
CPC ....... H04N 5/23296 (2013.01); H04N 5/3572 (2013.01); H04N 5/3696 (2013.01)

(56) References Cited

U.S. PATENT DOCUMENTS

| 2014/0192248 A1 | 7/2014 | Kishi |
| 2015/0249782 A1 | 9/2015 | Fukuda |
| 2016/0277669 A1* | 9/2016 | Kusaka .................... G02B 7/34 |

FOREIGN PATENT DOCUMENTS

| CN | 104583831 A | 4/2015 |
| JP | 2000-156823 A | 6/2000 |
| JP | 2001-083407 A | 3/2001 |

OTHER PUBLICATIONS

Chinese Office Action dated May 3, 2018 and issued in corresponding Chinese Patent Application No. 201610560395.X together with English translation.

* cited by examiner

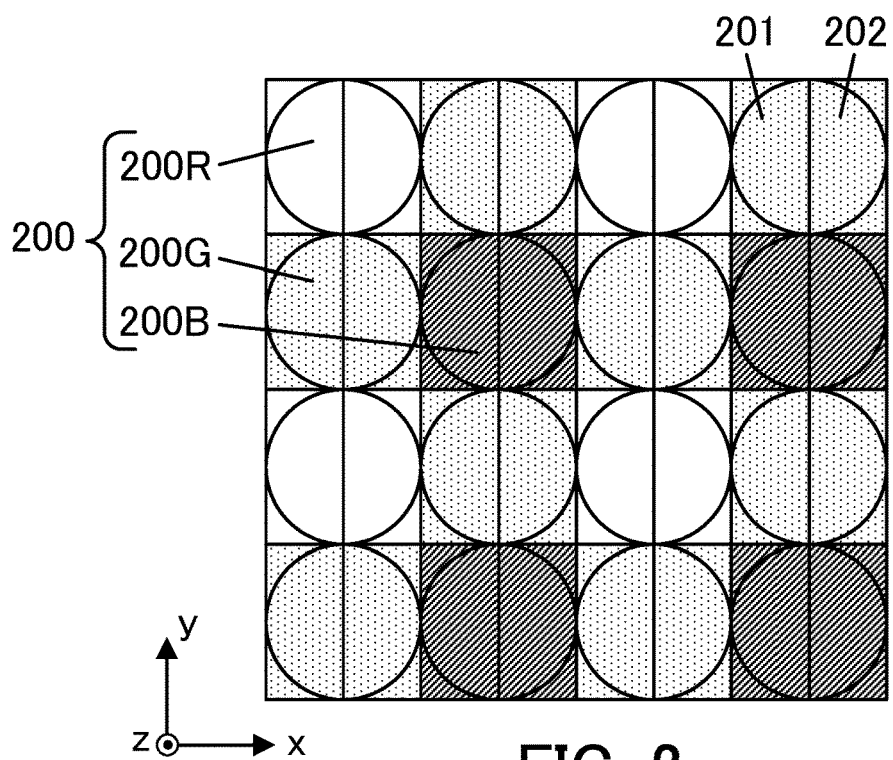
FIG. 2
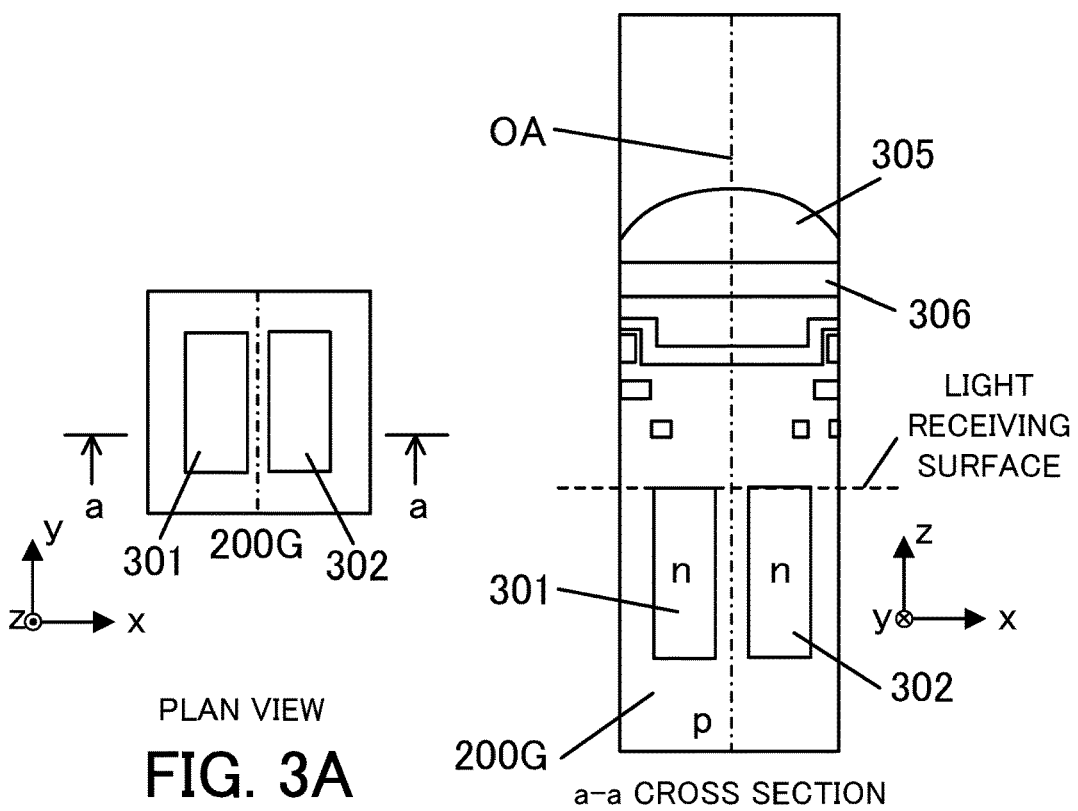
PLAN VIEW
FIG. 3A
a-a CROSS SECTION
FIG. 3B

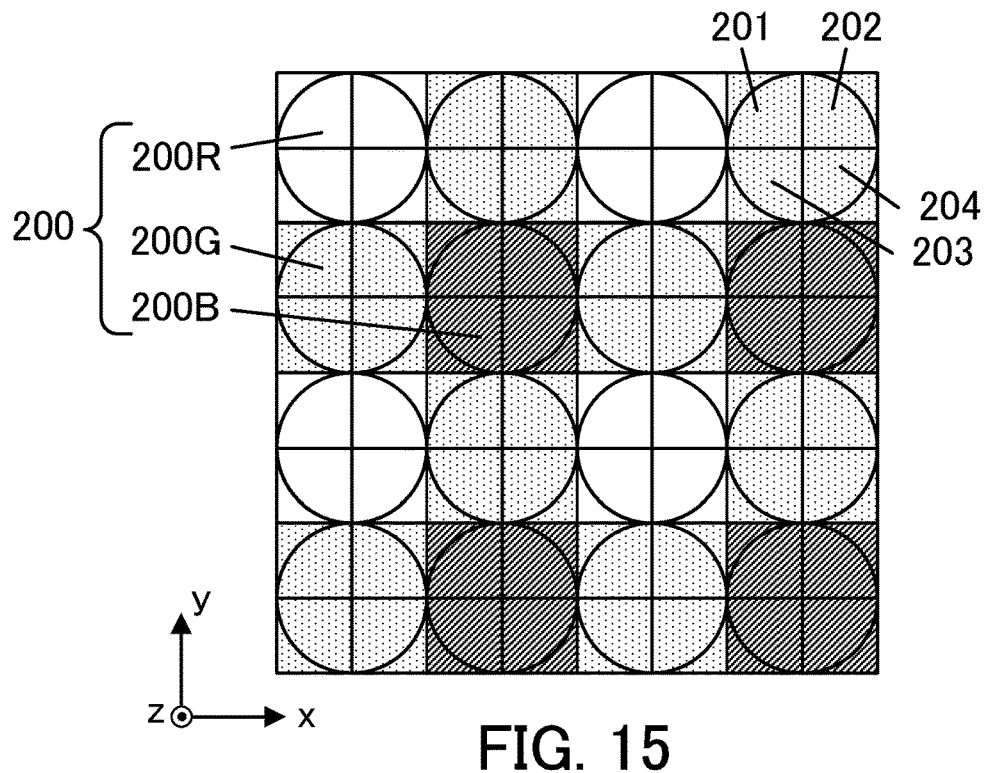
FIG. 15
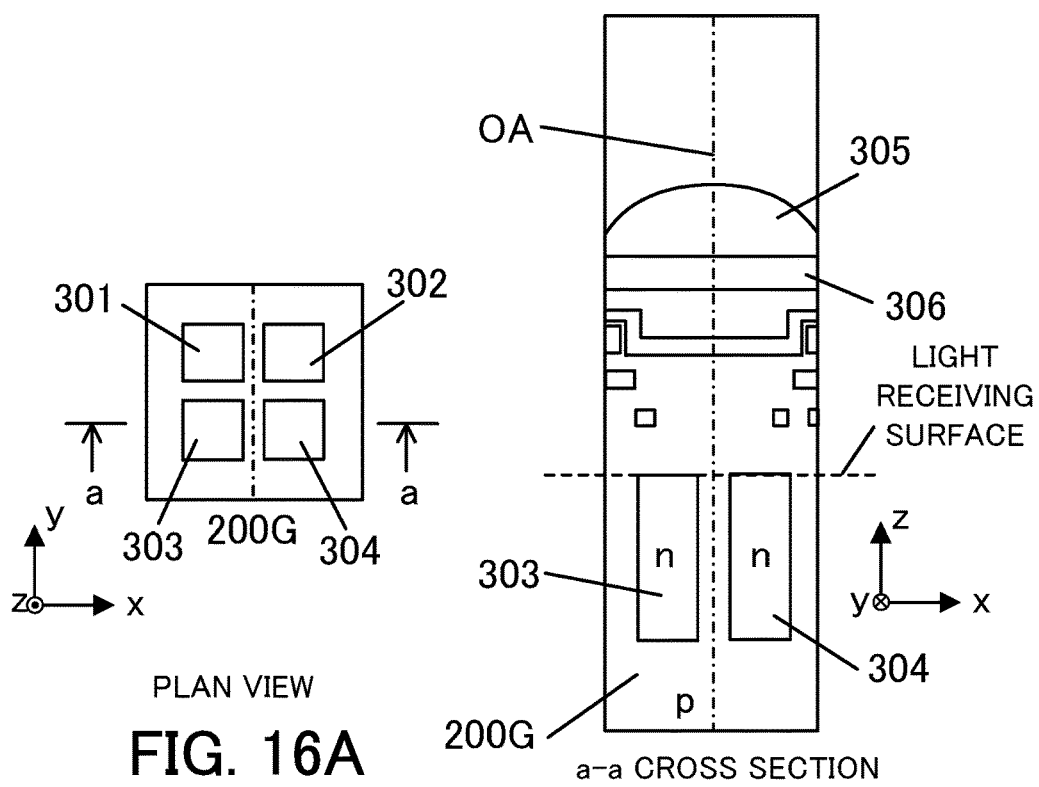
PLAN VIEW
FIG. 16A
a-a CROSS SECTION
FIG. 16B

CONTROL APPARATUS, IMAGE PICKUP APPARATUS, CONTROL METHOD, AND NON-TRANSITORY COMPUTER-READABLE STORAGE MEDIUM FOR PERFORMING FOCUS DETECTION

BACKGROUND OF THE INVENTION

Field of the Invention

The present invention relates to an image pickup apparatus which performs focus detection by a phase difference detection method.

Description of the Related Art

Conventional image pickup apparatuses which perform focus detection of a phase difference detection method (imaging-plane phase difference method) by using focus detection signals from an image pickup element are known. U.S. Pat. No. 4,410,804 discloses an image pickup apparatus using a two-dimensional image pickup element in which a single microlens and a plurality of divided photoelectric conversion portions are formed for each pixel. The divided photoelectric conversion portions receive light beams passing through different partial pupil regions of an exit pupil of an imaging lens via the single microlens for dividing the pupil. An image shift amount can be calculated based on each of focus detection signals that are received by the divided photoelectric conversion portions (focus detection pixels) to perform focus detection by a phase difference detection method. Japanese Patent Laid-open No. 2001-083407 discloses an image pickup apparatus which combines respective focus detection signals received by the divided photoelectric conversion portions.

Japanese Patent Laid-open No. 2000-156823 discloses an image pickup apparatus which includes a pair of focus detection pixels arranged partially in a part of an array of a plurality of imaging pixels. The pair of focus detection pixels receive light beams passing through different regions from each other in an exit pupil of an imaging lens for dividing the pupil. An image shift amount can be calculated based on focus detection signals of the pair of focus detection pixels to perform focus detection by the phase difference detection method. According to the focus detection by the phase difference detection method (imaging-plane phase difference method), a defocus direction and a defocus amount can be simultaneously detected by the focus detection pixels of the image pickup element, and accordingly it is possible to perform high-speed focus control.

However, in the imaging-plane phase difference method, a spatial frequency band of a focus detection signal for the focus detection may be different from a spatial frequency band of an imaging signal for generating a captured image. In this case, a difference between a detected in-focus position based on the focus detection signal and a best in-focus position based on the imaging signal occurs, and accordingly it is difficult to perform the focus detection with high accuracy.

SUMMARY OF THE INVENTION

The present invention provides a control apparatus, an image pickup apparatus, a control method, and a non-transitory computer-readable storage medium which are capable of reducing a difference between a detected in-focus position based on a focus detection signal and a best in-focus position based on an imaging signal to perform focus detection with high accuracy.

A control apparatus as one aspect of the present invention includes a generation unit configured to generate a first focus detection signal and a second focus detection signal based on a plurality of types of color signals from a first pixel group and a second pixel group that receive light beams passing through partial pupil regions different from each other in an imaging optical system, and a calculation unit configured to calculate a defocus amount by a phase difference detection method by using the first focus detection signal and the second focus detection signal, and the generation unit is configured to combine the plurality of types of color signals with respect to the first pixel group so that centroids of the color signals in a pupil division direction coincide with each other to generate the first focus detection signal, and combine the plurality of types of color signals with respect to the second pixel group so that centroids of the color signals in the pupil division direction coincide with each other to generate the second focus detection signal.

An image pickup apparatus as another aspect of the present invention includes an image pickup element including a first pixel group and a second pixel group configured to receive light beams passing through partial pupil regions different from each other in an imaging optical system, a generation unit configured to generate a first focus detection signal and a second focus detection signal based on a plurality of types of color signals from the first pixel group and the second pixel group, and a calculation unit configured to calculate a defocus amount by a phase difference detection method by using the first focus detection signal and the second focus detection signal, and the generation unit is configured to combine the plurality of types of color signals with respect to the first pixel group so that centroids of the color signals in a pupil division direction coincide with each other to generate the first focus detection signal, and combine the plurality of types of color signals with respect to the second pixel group so that centroids of the color signals in the pupil division direction coincide with each other to generate the second focus detection signal.

A control method as another aspect of the present invention includes the steps of generating a first focus detection signal and a second focus detection signal based on a plurality of types of color signals from a first pixel group and a second pixel group that receive light beams passing through partial pupil regions different from each other in an imaging optical system; and calculating a defocus amount by a phase difference detection method by using the first focus detection signal and the second focus detection signal, and the step of generating the first focus detection signal and the second focus detection signal includes combining the plurality of types of color signals with respect to the first pixel group so that centroids of the color signals in a pupil division direction coincide with each other to generate the first focus detection signal, and combining the plurality of types of color signals with respect to the second pixel group so that centroids of the color signals in the pupil division direction coincide with each other to generate the second focus detection signal.

A control method as another aspect of the present invention is a control method of acquiring a plurality of detection signals to be used in a phase difference detection method to calculate distance information, the method including the steps of performing first processing on a viewpoint image including a plurality of types of color signals to acquire a combined signal of the color signals, and performing second processing on the combined signal to generate the detection signal, and the first processing combines the color signals so that centroids of the viewpoint images in a viewpoint direction coincide with each other.

A non-transitory computer-readable storage medium as another aspect of the present invention stores a program which causes a computer to execute the control method.

Further features of the present invention will become apparent from the following description of exemplary embodiments with reference to the attached drawings.

BRIEF DESCRIPTION OF THE DRAWINGS

FIG. 2 is a diagram of illustrating a pixel array in each of Embodiments 1 and 2.

FIGS. 3A and 3B are diagrams of illustrating a pixel structure in each of Embodiments 1 and 2.

FIG. 15 is a diagram of illustrating a pixel array in Embodiment 3.

FIGS. 16A and 16B are diagrams of illustrating a pixel structure in Embodiment 3.

DESCRIPTION OF THE EMBODIMENTS

Exemplary embodiments of the present invention will be described below with reference to the accompanied drawings. Each of the embodiments of the present invention described below can be implemented solely or as a combination of a plurality of the embodiments or features thereof where necessary or where the combination of elements or features from individual embodiments in a single embodiment is beneficial.

[Embodiment 1]

Figure 1:
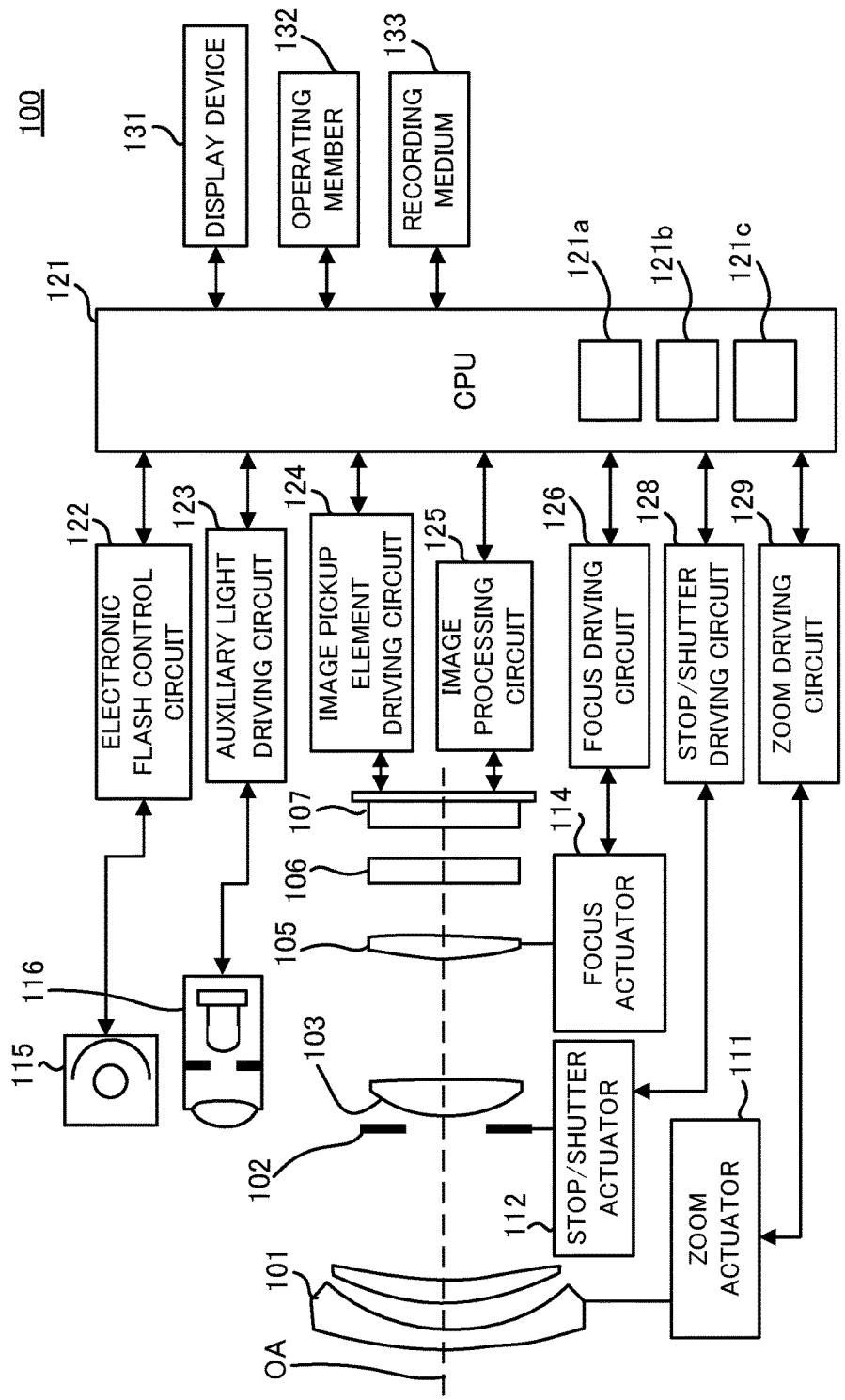
FIG. 1 is a block diagram of an image pickup apparatus in each embodiment.

First of all, referring to FIG. 1, a schematic configuration of an image pickup apparatus in Embodiment 1 of the present invention will be described. FIG. 1 is a block diagram of an image pickup apparatus 100 (camera) in this embodiment. The image pickup apparatus 100 is a digital camera system that includes a camera body and an interchangeable lens (imaging optical system or image pickup optical system) removably attached to the camera body. However, this embodiment is not limited thereto, and can be applied also to an image pickup apparatus including a camera body and a lens which are integrated with each other.

A first lens unit 101 is disposed at the forefront side (object side) of a plurality of lens units that constitute an imaging lens (imaging optical system), and it is held on a lens barrel so as to be movable back and forth in a direction of an optical axis OA (optical axis direction). A stop/shutter 102 (aperture stop) adjusts its opening diameter to control a light intensity when capturing an image, and it also functions as a shutter to control an exposure time when capturing a still image. A second lens unit 103 moves integrally with the stop/shutter 102 back and forth in the optical axis direction, and it has a zoom function that performs a magnification-varying operation in conjunction with the back-and-forth motion of the first lens unit 101. A third lens unit 105 is a focus lens unit that moves back and forth in the optical axis direction to perform focusing (focus operation). An optical low-pass filter 106 is an optical element that reduces a false color or a moire of a captured image (photographed image).

An image pickup element 107 (image sensor) performs photoelectric conversion of an object image (optical image) formed via the imaging optical system, and for example it includes a CMOS sensor or a CCD sensor, and its peripheral circuit. As the image pickup element 107, for example a two-dimensional single plate color sensor is used, which includes a primary color mosaic filter having a Bayer array formed on a light receiving pixel having m pixels in a horizontal direction and having n pixels in a vertical direction in an on-chip configuration.

A zoom actuator 111 rotationally moves (drives) a cam cylinder (not illustrated) to move the first lens unit 101 and the second lens unit 103 along the optical axis direction to perform the magnification-varying operation. The stop/shutter actuator 112 controls the opening diameter of the stop/shutter 102 to adjust the light intensity (photographing light intensity) and also controls the exposure time in capturing the still image. A focus actuator 114 moves the third lens unit 105 in the optical axis direction to perform the focusing.

An electronic flash 115 is an illumination device to be used for illuminating the object. As the electronic flash 115, a flash illumination device that includes a xenon tube or an illumination device that includes an LED (light emitting diode) continuously emitting light is used. An AF auxiliary lighting unit 116 projects an image of a mask having a predetermined opening pattern onto the object via a projection lens. In this configuration, a focus detection capability for a dark object or an object with a low contrast can be improved.

The CPU 121 is a control apparatus (control unit or controller) that governs various controls of the image pickup apparatus 100. The CPU 121 includes a processor, a ROM, a RAM, an A/D converter, a D/A converter, a communication interface circuit, and the like. The CPU 121 reads out and executes a predetermined program stored in the ROM to drive various circuits of the image pickup apparatus 100 and to perform a series of operations such as focus detection (AF), image capturing (photographing), image processing, or recording. The communication interface circuit can perform communication using a wireless technology such as a wireless LAN, as well as communication using a cable such as a USB and a wired LAN.

The CPU 121 includes a generation unit 121a (generation circuit, or generator), a calculation unit 121b (calculation circuit, or calculator), and a focus control unit 121c (focus control circuit, or focus controller). The generation unit 121a generates a first focus detection signal and a second focus detection signal based on a plurality of types of color signals from a plurality of photoelectric conversion portions (first pixel group and second pixel group) that receive light beams passing through partial pupil regions of the imaging optical system different from each other. The calculation unit 121b calculates a defocus amount by a phase difference detection method by using the first focus detection signal and the second focus detection signal. The focus control unit 121c performs focus control based on the defocus amount. The generation unit 121a can generate viewpoint images (parallax images) based on the plurality of types of color signals.

An electronic flash control circuit 122 performs a lighting control of the electronic flash 115 in synchronization with the image capturing operation. An auxiliary light driving circuit 123 performs a lighting control of the AF auxiliary lighting unit 116 in synchronization with the focus detection operation. An image pickup element driving circuit 124 controls the image capturing operation such as vertical scanning and horizontal scanning of the image pickup element 107 and also performs the A/D conversion of the acquired image signal to send it to the CPU 121. An A/D conversion circuit (A/D converter) may be provided in the image pickup element 107. An image processing circuit 125 performs processing such as ay (gamma) conversion, a color interpolation, or a JPEG (Joint Photographic Experts Group) compression on the image data output from the image pickup element 107.

A focus driving circuit 126 drives the focus actuator 114 based on the focus detection result to move the third lens unit 105 along the optical axis direction to perform the focusing. A stop/shutter driving circuit 128 drives the stop/shutter actuator 112 to control the opening diameter of the stop/shutter 102. A zoom driving circuit 129 drives the zoom actuator 111 in response to a zoom operation by a user.

A display device 131 includes for example an LCD (liquid crystal display). The display device 131 displays information relating to an image capturing mode of the image pickup apparatus 100, a preview image before capturing an image, a confirmation image after capturing the image, an in-focus state displaying image in the focus detection, or the like. An operating member 132 (operating switch unit) includes a power switch, a release (image capturing trigger) switch, a zoom operation switch, an image capturing mode selection switch, and the like. The release switch is a two-step switch in a half-depression state (in a state where SW1 is ON) and in a full-depression state (in a state where SW2 is ON). A recording medium 133 is for example a flash memory that is removable from the image pickup apparatus 100, and it records the captured image (image data). The operating member 132 may include a touch panel so that the operation can be performed by using the touch panel.

Next, referring to FIGS. 2, 3A, and 3B, a pixel array and a pixel structure of the image pickup element 107 in this embodiment will be described. FIG. 2 is a diagram of illustrating the pixel array of the image pickup element 107. FIGS. 3A and 3B are diagrams of illustrating the pixel structure of the image pickup element 107, and FIGS. 3A and 3B illustrate a plan view of a pixel 200G of the image pickup element 107 (view in a +z direction) and a cross-sectional view along a line a-a in FIG. 3A (view in a −y direction), respectively.

FIG. 2 illustrates the pixel array (array of imaging pixels) of the image pickup element 107 (two-dimensional CMOS sensor) in a range of 4 columns×4 rows. In this embodiment, each of the imaging pixels (pixels 200R, 200G, and 200B) includes two subpixels 201 and 202 (two focus detection pixels). Therefore, FIG. 2 illustrates the array of the subpixels in a range of 8 columns×4 rows.

As illustrated in FIG. 2, a pixel group 200 of 2 columns×2 rows includes the pixels 200R, 200G, and 200B in a Bayer array. In other words, in the pixel group 200, the pixel 200R having a spectral sensitivity for R (red) is disposed at the upper left, the pixels 200G having a spectral sensitivity for G (green) are disposed at the upper right and at the lower left, and the pixel 200B having a spectral sensitivity for B (blue) is disposed at the lower right. Each of the pixels 200R, 200G, and 200B (each imaging pixel) includes a subpixel 201 (first focus detection pixel) and a subpixel 202 (second focus detection pixel) arrayed in 2 columns×1 row. The subpixel 201 is a pixel which receives a light beam passing through a first pupil region of the imaging optical system. The subpixel 202 is a pixel which receives a light beam passing through a second pupil region of the imaging optical system. The plurality of subpixels 201 constitute a first pixel group, and the plurality of subpixels 202 constitute a second pixel group.

As illustrated in FIG. 2, the image pickup element 107 includes a number of imaging pixels of 4 columns×4 rows (subpixels of 8 columns×4 rows) arranged on a surface, and it outputs an imaging signal (subpixel signal). In the image pickup element 107 of this embodiment, a period P of the pixels (imaging pixels) is 4 μm, and the number N of the pixels (imaging pixels) is horizontally 5575 columns×vertically 3725 rows=approximately 20.75 million pixels. In the image pickup element 107, a period $P_{SUB}$ of the sub pixels in a column direction is 2 μm, and the number $N_{SUB}$ of the subpixels is horizontally 11150 columns×vertically 3725 rows=approximately 41.50 million pixels.

As illustrated in FIG. 3B, the pixel 200G of this embodiment is provided with a microlens 305 at a light receiving surface side of the pixel to condense incident light. The plurality of microlenses 305 are arrayed in two dimensions, and each of the microlenses 305 is disposed at a position away from the light receiving surface by a predetermined distance in a z-axis direction (direction of an optical axis direction OA). In the pixel 200G, a photoelectric conversion portion 301 and a photoelectric conversion portion 302 (photoelectric converters) are formed by dividing the pixel into $N_H$ (two divisions) in an x direction and into $N_v$ (one division) in a y direction. The photoelectric conversion portion 301 and the photoelectric conversion portion 302 correspond to the subpixel 201 and the subpixel 202, respectively. As described above, the image pickup element 107 includes a plurality of photoelectric conversion portions for a single microlens, and the microlenses are arranged in two dimensions. Each of the photoelectric conversion portions 301 and 302 is configured as a photodiode having a p-i-n structure that includes a p-type layer and an n-type layer and an intrinsic layer between the p-type layer and the n-type layer. If necessary, the intrinsic layer can be excluded and a photodiode with a p-n junction may be applicable.

The pixel 200G (each pixel) is provided with a G (green) color filter 306 between the microlens 305 and each of the photoelectric conversion portions 301 and 302. Similarly, the pixels 200R and 200B (each pixel) are provided with R (red) and B (blue) color filters 306, respectively, between the microlens 305 and each of the photoelectric conversion portions 301 and 302. If necessary, a spectral transmittance of the color filter 306 can be changed for each subpixel, or alternatively the color filter may be excluded.

As illustrated in FIGS. 3A and 3B, the light entering the pixel 200G (200R or 200B) is condensed by the microlens 305 and is dispersed by the G color filter 306 (R or B color filter 306), and then the dispersed lights are received by the photoelectric conversion portions 301 and 302. In each of the photoelectric conversion portions 301 and 302, pairs of an electron and a hole are generated depending on a light receiving amount and they are separated in a depletion layer, and then the electrons with a negative charge are accumulated in the n-type layer. On the other hand, the holes are excluded to the outside of the image pickup element 107 through the p-type layer connected to a constant voltage source (not illustrated). The electrons accumulated in the n-type layers of the photoelectric conversion portions 301 and 302 are transferred, based on a scanning control from the image pickup element driving circuit 124, to an electrostatic capacitance (FD) through a transfer gate to be converted to a voltage signal.

Figure 4:
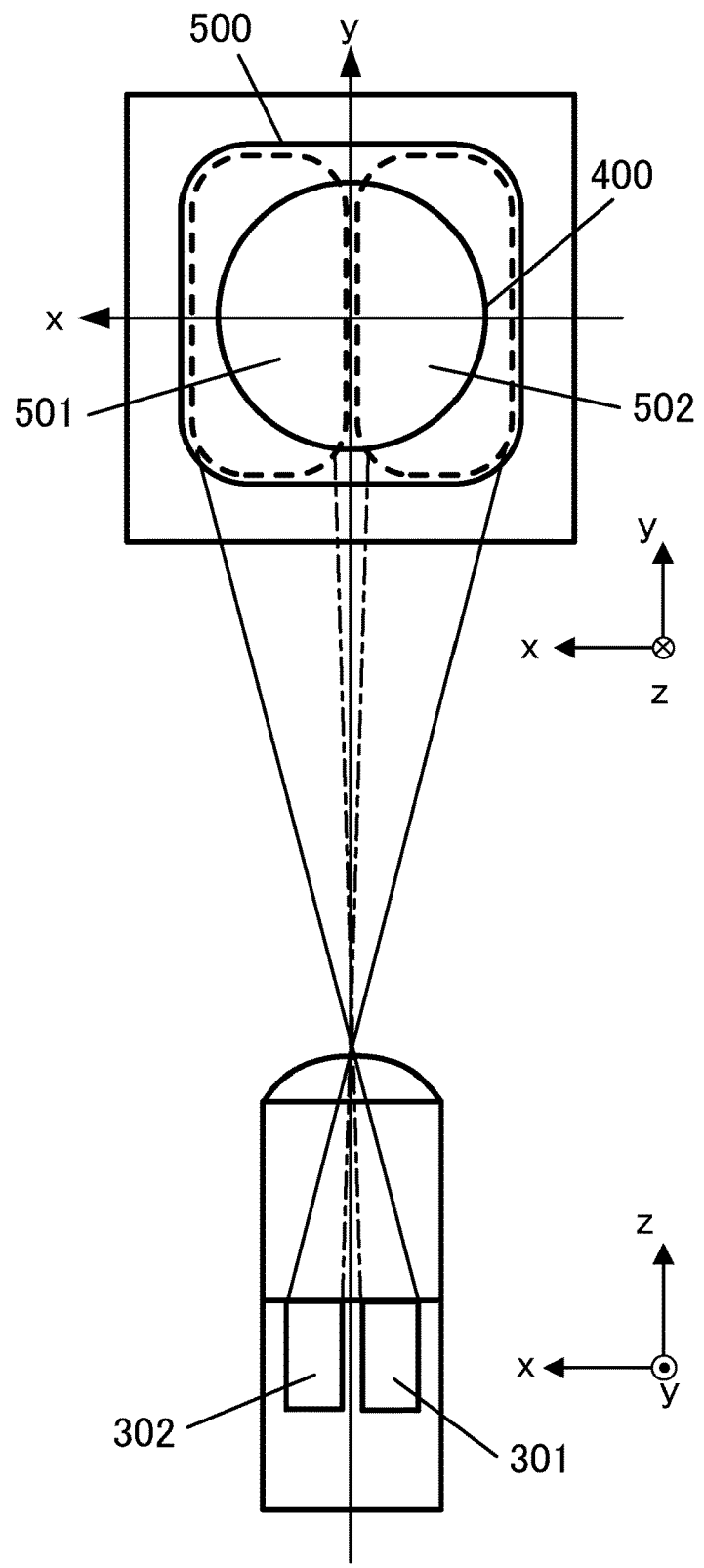
FIG. 4 is an explanatory diagram of an image pickup element and a pupil dividing function in each embodiment.

Subsequently, referring to FIG. 4, a pupil dividing function of the image pickup element 107 will be described. FIG. 4 is an explanatory diagram of the pupil dividing function of the image pickup element 107, and illustrates a situation of the pupil division in one pixel portion. FIG. 4 illustrates a cross-sectional view of the section A-A of the pixel structure illustrated in FIG. 3A when seen in the +y direction and an exit pupil plane of the imaging optical system. In FIG. 4, in order to correspond to a coordinate axis of the exit pupil plane, the x-axis and y-axis in the cross-sectional view are inverted with respect to the x-axis and y-axis of FIGS. 3A and 3B.

In FIG. 4, a partial pupil region 501 (first partial pupil region) for the subpixel 201 (first focus detection pixel) has approximately a conjugate relation, via the microlens 305, with respect to the light receiving surface of the photoelectric conversion portion 301 whose center of gravity is displaced (decentered) in the −x direction. Thus, the partial pupil region 501 represents a pupil region which is capable of receiving light by the subpixel 201. The center of gravity of the partial pupil region 501 for the subpixel 201 is displaced (decentered) in the +x direction on a pupil plane. A partial pupil region 502 (second partial pupil region) for the subpixel 202 (second focus detection pixel) has approximately a conjugate relation, via the microlens 305, with respect to the light receiving surface of the photoelectric conversion portion 302 whose center of gravity is displaced (decentered) in the +x direction. Thus, the partial pupil region 502 represents a pupil region which is capable of receiving light by the subpixel 202. The center of gravity of the partial pupil region 502 for the subpixel 202 is displaced (decentered) in the −x direction on the pupil plane. A pupil region 500 is a pupil region that is capable of receiving light over the entire region of the pixel 200G when the photoelectric conversion portions 301 and 302 (subpixels 201 and 202) are entirely combined.

Figure 5:
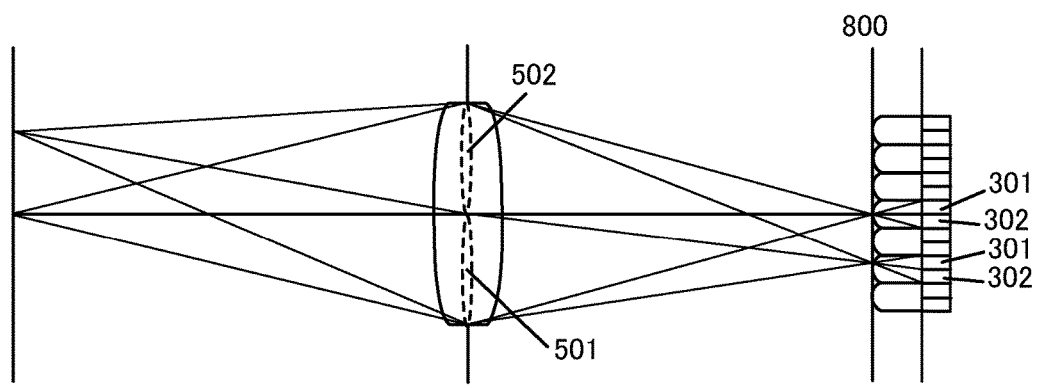
FIG. 5 is an explanatory diagram of the image pickup element and the pupil dividing function in each embodiment.

FIG. 5 is a diagram of explaining the image pickup element 107 and the pupil dividing function. The light beams passing through the partial pupil regions 501 and 502 different from each other in the pupil region of the imaging optical system enter each pixel of the image pickup element 107, i.e. an imaging plane 800 of the image pickup element 107, at angles different from each other, and are received by the subpixels 201 and 202 divided into 2×1. This embodiment describes an example in which the pupil region is divided into two in a horizontal direction, but is not limited to this and the pupil division may be performed in a vertical direction if necessary.

In this embodiment, the image pickup element 107 includes a first focus detection pixel of a first color that receives a light beam passing through a first partial pupil region of the imaging optical system (imaging lens), and a first focus detection pixel of a second color that receives the light beam passing through the first partial pupil region. Furthermore, the image pickup element 107 includes a second focus detection pixel of the first color that receives a light beam passing through a second partial pupil region different from the first partial pupil region of the imaging optical system, and a second focus detection pixel of the second color that receives the light beam passing through the second partial pupil region. The image pickup element 107 includes a plurality of arrayed imaging pixels that receive light beams passing through a pupil region formed by combining the first partial pupil region and the second partial pupil region of the imaging optical system. In this embodiment, each imaging pixel (pixel 200) is constituted by the first focus detection pixel (subpixel 201) and the second focus detection pixel (subpixel 202). If necessary, the imaging pixel, the first focus detection pixel, and the second focus detection pixel may be constituted by different pixels from each other. In this case, the first focus detection pixel and the second focus detection pixel are partially (discretely) arranged in a part of the imaging pixel array.

In this embodiment, the image pickup apparatus 100 collects light receiving signals of the first focus detection pixels (subpixels 201) of the respective pixels of the image pickup element 107 to generate the first focus detection signal, and collects light receiving signals of the second focus detection pixels (subpixels 202) of the respective pixels to generate the second focus detection signal to perform the focus detection. Furthermore, the image pickup apparatus 100 adds (combines) signals of the first focus detection pixel and the second focus detection pixel for each pixel of the image pickup element 107 to generate an imaging signal (captured image) with a resolution corresponding to the number N of effective pixels. As described above, the image pickup apparatus 100 includes an image generation unit (CPU 121) that generates the captured image based on the signal obtained by adding (combining) pixels included in each of the first pixel group and the second pixel group for each microlens.

Figure 6:
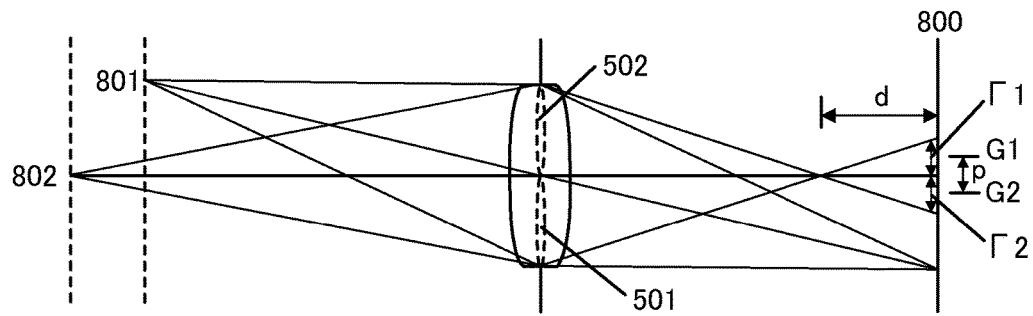
FIG. 6 is a diagram of a relationship between a defocus amount and an image shift amount in each embodiment.

Next, referring to FIG. 6, the relation between a defocus amount of the first focus detection signals acquired from the subpixels 201 of the image pickup element 107 and the second focus detection signals acquired from the subpixels 202, and an image shift amount will be described. FIG. 6 is a diagram of illustrating the relation between the defocus amount and the image shift amount. In FIG. 6, the image pickup element 107 is disposed on the imaging plane 800, and similarly to FIGS. 4 and 5, a situation in which the exit pupil of the imaging optical system is divided into two partial pupil regions 501 and 502 is illustrated.

A defocus amount d is defined such that a distance from an imaging position of an object to the imaging plane 800 is |d|, a front focus state in which the imaging position is located at an object side relative to the imaging plane 800 is a negative sign (d<0), and a rear focus state in which the imaging position is located at a side opposite to the object relative to the imaging plane 800 is a positive sign (d>0). In an in-focus state in which the imaging position of the object is on the imaging plane 800 (in-focus position), the defocus amount d=0 is satisfied. In FIG. 6, an object 801 which is in the in-focus state (d=0) and an object 802 which is in the front focus state (d<0) are illustrated. The front focus state (d<0) and the rear focus state (d>0) are collectively referred to as a defocus state (|d|>0).

In the front focus state (d<0), the light beam that has passed through the partial pupil region 501 (or partial pupil region 502) of light beams from the object 802 is condensed once. Then, the light beam spreads to a width Γ1 (Γ2) around a center position of gravity G1 (G2) of the light beam, and a blurred image is formed on the imaging plane 800. The blurred image is received by the subpixels 201 (subpixels 202) constituting each pixel arrayed in the image pickup element 107, and the first focus detection signal (second focus detection signal) is generated. Therefore, the first focus detection signal (second focus detection signal) is recorded as a blurred object image in which the object 802 is blurred to have the width Γ1 (Γ2) at the center position of gravity G1 (G2) on the imaging plane 800. The blurred width Γ1 (Γ2) of the object image roughly increases in proportion as the absolute value |d| of the defocus amount d increases. Similarly, an absolute value |p| of an image shift amount p of the object image between the first and second focus detection signals (i.e. which is equivalent to a difference of the center positions of gravity of the light beams (G1–G2)) roughly increases as the absolute value |d| of the defocus amount d increases. This is similarly applied to the rear focus state (d>0), but an image shift direction of the object image between the first and second focus detection signals is opposite to that in the front focus state.

As described above, in this embodiment, the absolute value of the image shift amount between the first and second focus detection signals increases with increasing the absolute value of the defocus amount of the first and second focus detection signals, or the imaging signals obtained by adding the first and second focus detection signals.

Next, focus detection in this embodiment will be described. The image pickup apparatus 100 of this embodiment performs, as the focus detection, first focus detection and second focus detection. The first focus detection is focus detection by the phase difference detection method in which a signal period of a focus detection signal in the pupil division direction is large and a spatial frequency band is low. The second focus detection is focus detection by the phase difference detection method in which the signal period of the focus detection signal in the pupil division direction is small and the spatial frequency band is high. In this embodiment, the column direction of the image pickup element 107 is the pupil division direction, and the row direction of the image pickup element 107 is a direction orthogonal to the pupil division direction. The first focus detection is performed for focusing from a large defocus state to a small defocus state, and the second focus detection is performed for focusing from the small defocus state to a neighborhood of a best in-focus position.

Next, the first focus detection by a phase difference detection method in this embodiment will be described. When the first focus detection is to be performed, the CPU 121 (calculation unit 121b) of the image pickup apparatus 100 relatively shifts the first and second focus detection signals to calculate a first correlation amount (first evaluation value) that represents a degree of coincidence of the signals. Then, the CPU 121 calculates an image shift amount based on a shift amount in which the correlation (degree of coincidence) is good. There is a relation in which an absolute value of the image shift amount between the first and second focus detection signals increases as an absolute value of the defocus amount of the imaging signal increases, and accordingly the CPU 121 converts the image shift amount into a first defocus amount to perform the focus detection.

Figure 7:
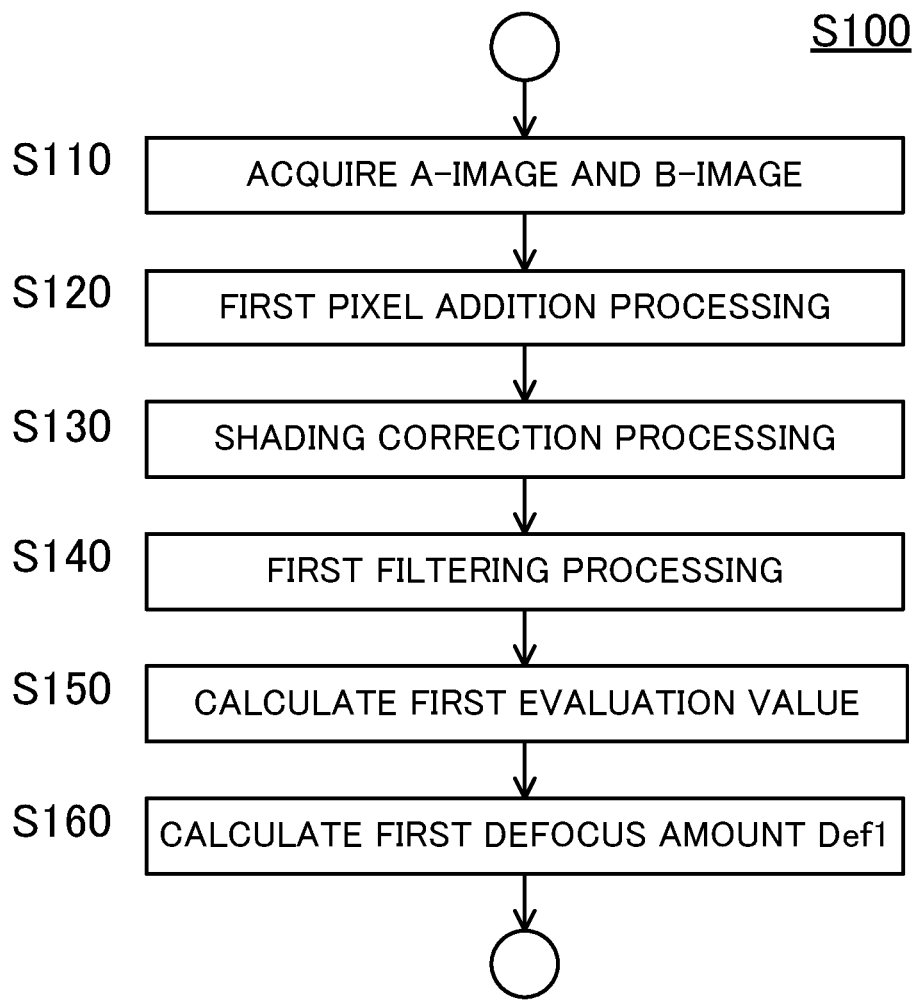
FIG. 7 is a flowchart of illustrating a first focus detection process in each embodiment.

Referring to FIG. 7, a flow of a first focus detection process by the phase difference detection method will be described. FIG. 7 is a flowchart of illustrating the first focus detection process, and it corresponds to step S100 in FIG. 13 described below. Each step of FIG. 7 is performed mainly by the CPU 121 (generation unit 121a and calculation unit 121b) and the image processing circuit 125.

First of all, at step S110, the CPU 121 sets a focus detection area for focusing in an effective pixel area of the image pickup element 107. Then, the CPU 121 (generation unit 121a) generates (acquires) a first focus detection signal (A-image signal) for each of colors of R, G, and B based on a light receiving signal (output signal) of the first focus detection pixel for each of colors of R, G, and B (first color, second color, and third color) included in the focus detection area. Similarly, the CPU 121 generates (acquires) a second focus detection signal (B-image signal) for each of colors of R, G, and B based on a light receiving signal (output signal) of the second focus detection pixel for each of colors of R, G, and B included in the focus detection area.

Subsequently, at step S120, the CPU 121 (generation unit 121a) performs first pixel addition processing to convert each of the color signals (RGB signals) to a luminance signal (Y signal) for each of the first and second focus detection signals of R, G, and B. As a result, processed first and second focus detection signals are generated.

Figure 8:
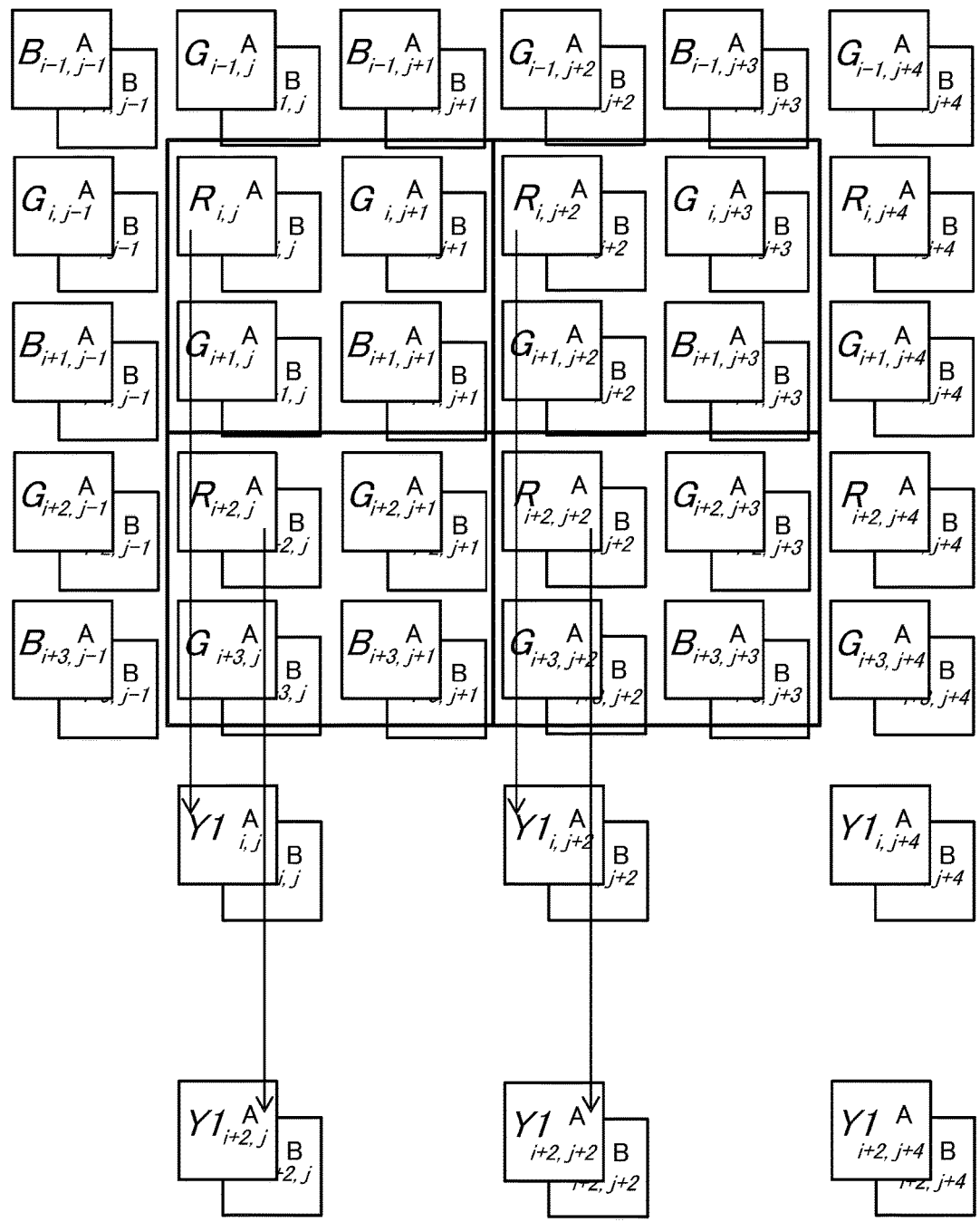
FIG. 8 is an explanatory diagram of first pixel addition processing in each embodiment.

Referring to FIG. 8, first pixel addition processing in this embodiment will be described. FIG. 8 is an explanatory diagram of the first pixel addition processing. In FIG. 8, the first focus detection signal at j-th in a column direction (pupil division direction) and at i-th in a row direction (direction orthogonal to the pupil division direction) in Bayer array is represented by A (i, j). The first focus detection signal is indicated for each of colors of R, G, and B. The first focus detection signal of R (first color) is represented by RA(i,j)=A(i,j). The first focus detection signal of G (second color) is represented by GA(i,j+1)=A(i,j+1) and GA(i+1,j)=A(i+1,j). The first focus detection signal of B (third color) is represented by BA(i+1,j+1)=A(i+1,j+1). Similarly, the second focus detection signal at j-th in the column direction (pupil division direction) and at i-th in the row direction (direction orthogonal to the pupil division direction) in the Bayer array is represented by B(i,j). The second focus detection signal is also indicated for each of colors of R, G, and B. The second focus detection signal of R (first color) is represented by RB(i,j)=B (i,j). The second focus detection signal of G (second color) is represented by GB (i, j+1)=B (i, j+1) and GB (i+1, j)=A(i+1,j). The second focus detection signal of B (third color) is represented by BB (i+1,j+1)=B (i+1,j+1).

According to the first pixel addition processing at step S120 in FIG. 7, as represented by expression (1A) below, a first focus detection signal Y1A(i,j) as a Y signal can be calculated based on the first focus detection signal A(i,j) of the Bayer array. Similarly, according to the first pixel addition processing, as represented by expression (1B) below, a second focus detection signal Y1B(i,j) as a Y signal can be calculated based on the second focus detection signal B(i,j) of the Bayer array.

$$Y1A(i, j) = \begin{pmatrix} A(i, j) & A(i, j+1) \\ A(i+1, j) & A(i+1, j+1) \end{pmatrix} \begin{pmatrix} \frac{1}{4} & \frac{1}{4} \\ \frac{1}{4} & \frac{1}{4} \end{pmatrix}, \quad (1A)$$

$$= \frac{1}{4}[RA(i, j) + GA(i, j+1) + GA(i+1, j) + BA(i+1, j+1)].$$

$$Y1B(i, j) = \begin{pmatrix} B(i, j) & B(i, j+1) \\ B(i+1, j) & B(i+1, j+1) \end{pmatrix} \begin{pmatrix} \frac{1}{4} & \frac{1}{4} \\ \frac{1}{4} & \frac{1}{4} \end{pmatrix}, \quad (1B)$$

$$= \frac{1}{4}[RB(i, j) + GB(i, j+1) + GB(i+1, j) + BB(i+1, j+1)].$$

In expressions (1A) and (1B), i=2m and j=2n (m and n are integers) are satisfied. The values of i and j are multiples of two because the pixels of this embodiment are arranged in the Bayer array. Accordingly, if the pixels are arranged differently from the Bayer array, it is preferred that i or j is adjusted according to a periodicity of the array. For example, if color filters are arranged with a period of four pixels in a horizontal direction, it is preferred that i or j is set to a multiple of four.

In the first focus detection process of this embodiment, a signal period of the focus detection signal as a Y signal in the column direction (pupil division direction) is larger than a signal period of the focus detection signal of the Bayer array in the column direction (pupil division direction). Furthermore, in the first focus detection process of this embodiment, in order to perform the focus detection stably from a large defocus state to a small defocus state, the first pixel addition processing is performed so that the signal period of the focus detection signal in the pupil division direction increases and a spatial frequency band of the focus detection signal is lowered.

Figures 9A, 9B, 9C:
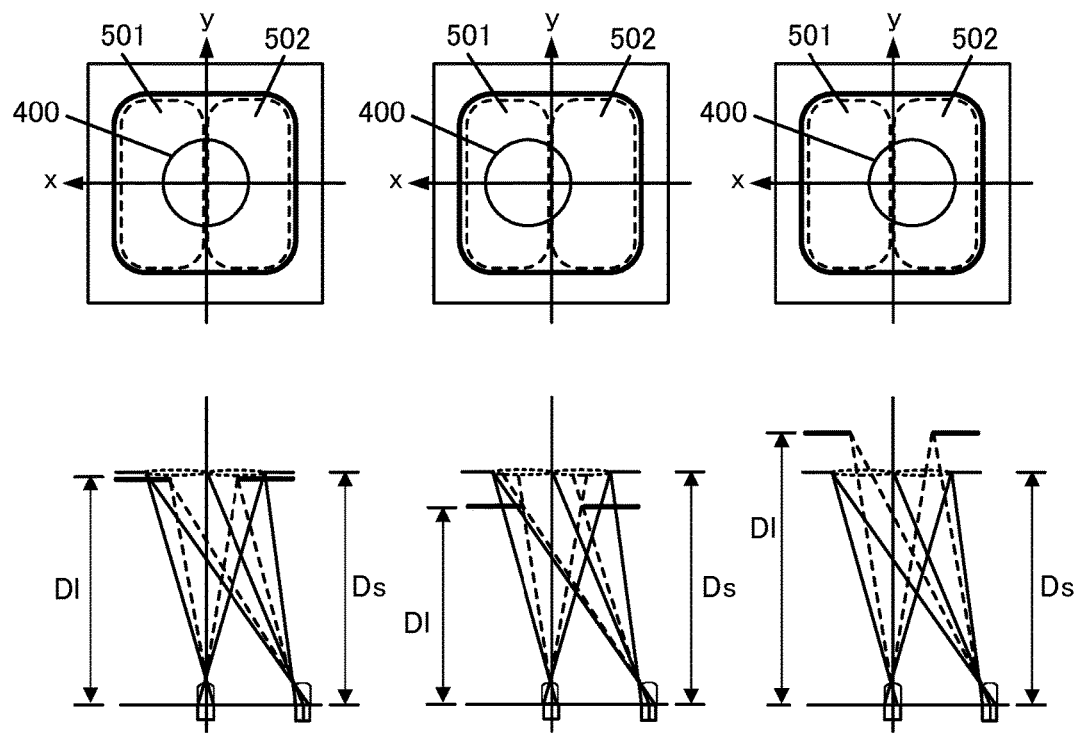
FIGS. 9A to 9C are explanatory diagrams of a shading caused by a pupil shift of a first focus detection signal and a second focus detection signal in each embodiment.

Subsequently, at step S130, the CPU 121 and the image processing circuit 125 perform shading correction processing (optical correction processing) for each of the first and second focus detection signals. Referring to FIGS. 9A to 9C, a shading caused by a pupil shift of the first and second focus detection signals will be described. FIGS. 9A to 9C are explanatory diagrams of the shading caused by the pupil shift of the first and second focus detection signals. Specifically, FIGS. 9A to 9C illustrate a relation of the partial pupil region 501 of the subpixel 201 (first focus detection pixel) at a peripheral image height of the image pickup element 107, the partial pupil region 502 of the subpixel 202 (second focus detection pixel), and the exit pupil 400 of the imaging optical system.

FIG. 9A illustrates a case in which an exit pupil distance D1 of the imaging optical system (distance between the exit pupil 400 and the imaging plane of the image pickup element 107) is equal to a set pupil distance Ds of the image pickup element 107. In this case, the exit pupil 400 of the imaging optical system is approximately equally divided by the partial pupil regions 501 and 502.

On the other hand, as illustrated in FIG. 9B, when the exit pupil distance D1 of the imaging optical system is shorter than the set pupil distance Ds of the image pickup element 107, a pupil shift is generated between the exit pupil 400 of the imaging optical system and an entrance pupil of the image pickup element 107 at the peripheral image height of the image pickup element 107. Therefore, the exit pupil 400 of the imaging optical system is unequally divided. Similarly, as illustrated in FIG. 9C, when the exit pupil distance D1 of the imaging optical system is longer than the set pupil distance Ds of the image pickup element 107, the pupil shift is generated between the exit pupil 400 of the imaging optical system and the entrance pupil of the image pickup element 107 at the peripheral image height of the image pickup element 107. Therefore, the exit pupil 400 of the imaging optical system is unequally divided. Intensities of the first and second focus detection signals are unequal to each other as the pupil division is unequal at the peripheral image height. Accordingly, the shading occurs in which one of the intensities of the first and second focus detection signals increases and the other decreases.

At step S130 of FIG. 7, the CPU 121 generates a first shading correction coefficient of the first focus detection signal and a second shading correction coefficient of the second focus detection signal according to an image height of the focus detection area, an F number of the imaging lens (imaging optical system), and an exit pupil distance. Then, the CPU 121 (image processing circuit 125) multiplies the first focus detection signal by the first shading correction coefficient, and multiplies the second focus detection signal by the second shading correction coefficient to perform the shading correction processing (optical correction processing) on the first and second focus detection signals.

When performing the first focus detection by the phase difference detection method, the CPU 121 detects (calculates) the defocus amount (first defocus amount) based on the correlation (degree of coincidence) between the first and second focus detection signals. When the shading by the pupil shift occurs, the correlation (degree of coincidence) between the first and second focus detection signals may be decreased. Therefore, in this embodiment, when performing the first focus detection by the phase difference detection method, it is preferred that the CPU 121 performs the shading correction processing (optical correction processing) in order to improve the correlation (degree of coincidence) between the first and second focus detection signals to improve a focus detection performance.

Figure 10:
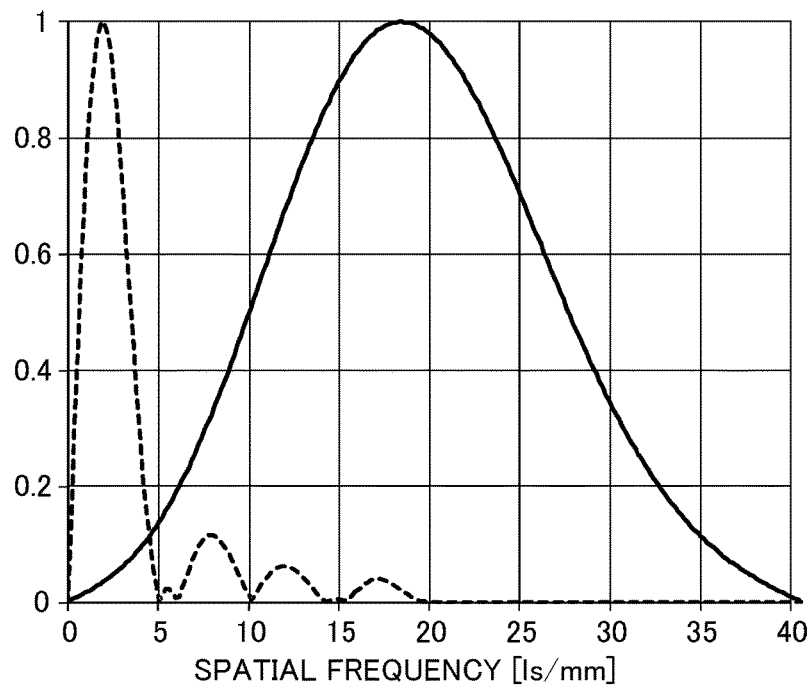
FIG. 10 is an explanatory diagram of a filter frequency band in each embodiment.

Subsequently, at step S140, the CPU 121 and the image processing circuit 125 perform first filtering processing on the first and second focus detection signals. FIG. 10 is an explanatory diagram of the first filtering processing, and it illustrates an example of a passband, with a dashed line, in the first filtering processing of this embodiment. In this embodiment, the focus detection in a large defocus state is performed by the first focus detection of the phase difference detection method. Accordingly, the passband in the first filtering processing includes a low frequency band. If necessary, in performing the focusing from the large defocus state to the small defocus state, the passband of the first filtering processing during the first focus detection process may be adjusted according to the defocus state.

Subsequently, at step S150, the CPU 121 (calculation unit 121b) performs first shift processing that relatively shifts the first and second focus detection signals on which the first filtering processing has been performed in a pupil division direction. Then, the CPU 121 calculates a first correlation amount (first evaluation value) that represents the degree of coincidence of the signals.

In this embodiment, for j-th in the column direction (pupil division direction) and i-th in the row direction (direction orthogonal to the pupil division direction), first and second focus detection signals in which the first filtering processing has been performed are denoted by dY1A(i,j) and dY1B(i,j), respectively. A range of the number j corresponding to the focus detection area is denoted by W, and a range of the number i is denoted by L. A shift amount by the first shift processing is denoted by $s_1$, and a shift range of the shift amount $s_1$ is denoted by Γ1. In this case, a correlation amount $COR1_{even}$ (first evaluation value) is represented by expression (2) below.

$$COR1_{even}(s_1) = \sum_{i \in L} \sum_{j \in W} |dY1A(i, j+s_1) - dY1B(i, j-s_1)|, s_1 \in \Gamma1 \quad (2)$$

When calculating the first correlation amount $COR1_{even}$, with respect to the shift amount $s_1$ for each i row, the CPU 121 relates $(j+s_1)$-th first focus detection signal $dY1A(i,j+s_1)$ in the column direction to $(j-s_1)$-th second focus detection signal $dY1B(i, j-s_1)$ in the column direction to perform subtraction of them to generate a shift subtraction signal. Then, the CPU 121 calculates an absolute value of the generated shift subtraction signal and obtains a sum of the numbers j within a range W corresponding to the focus detection area to calculate a first correlation amount $COR1_{even}$ (i, $s_1$) for i row. Furthermore, the CPU 121 obtains a sum of the numbers i within a range L corresponding to the focus detection area for the first correlation amount $COR1_{even}$ (i, $s_1$) for each shift amount to calculate a first correlation amount $COR1_{even}$ ($s_1$).

Subsequently, at step S160, the CPU 121 (calculation unit 121*b*) performs a subpixel calculation for the first correlation amount (first evaluation value) to calculate a real-valued shift amount which indicates a minimum first correlation amount to obtain the image shift amount p1. Then, the CPU 121 multiplies the image shift amount p1 by a first conversion coefficient K1 according to the image height of the focus detection area, the F number of the imaging lens (imaging optical system), and the exit pupil distance to detect (calculate) a first defocus amount Def1.

Figure 11:
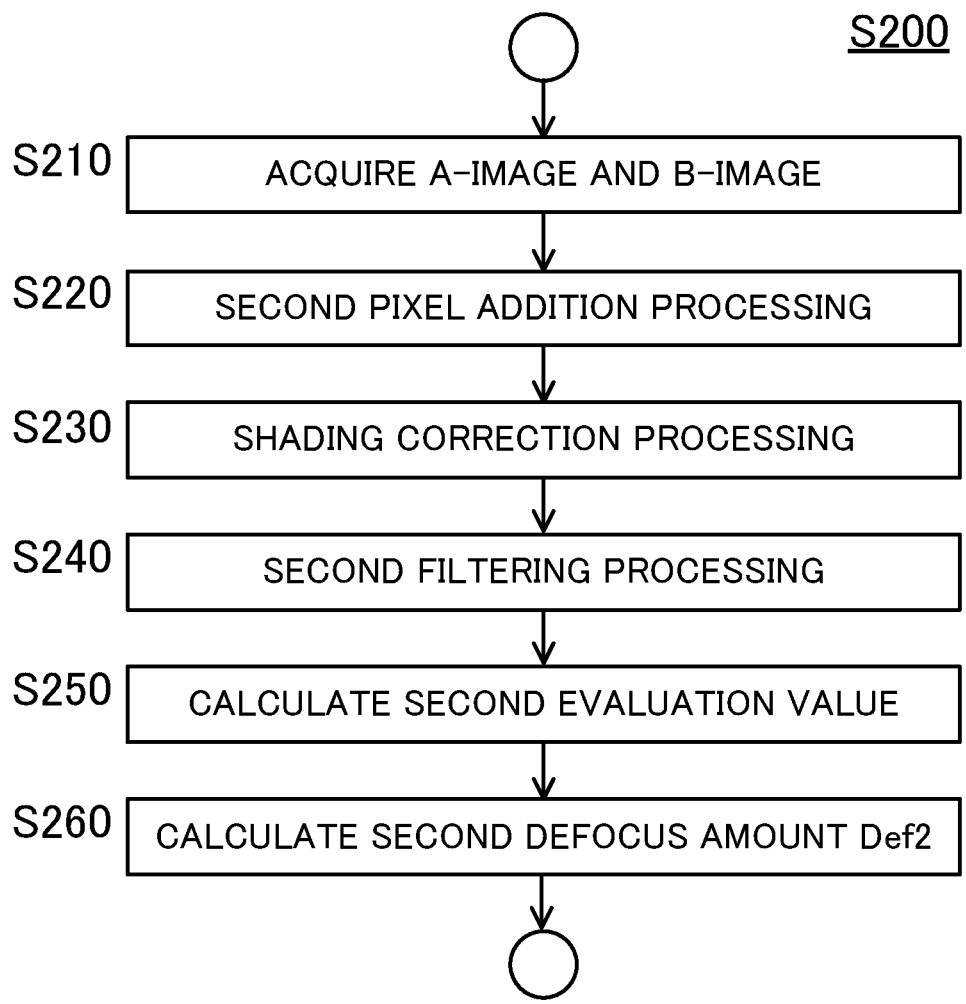
FIG. 11 is a flowchart of illustrating a second focus detection process in each embodiment.

Next, referring to FIG. 11, a second focus detection process by the phase difference detection method will be described. FIG. 11 is a flowchart of illustrating the second focus detection process, and it corresponds to step S200 in FIG. 13 described below. Each step in FIG. 11 is performed mainly by the CPU 121 (generation unit 121*a* or calculation unit 121*b*) and the image processing circuit 125.

First, at step S210, the CPU 121 sets a focus detection area for focusing in an effective pixel area of the image pickup element 107. Then, the CPU 121 (generation unit 121*a*) generates (acquires) a first focus detection signal (A-image signal) for each of colors of R, G, and B based on a light receiving signal (output signal) of the first focus detection pixel for each of colors of R, G, and B (first color, second color, and third color) included in the focus detection area. Similarly, the CPU 121 generates (acquires) a second focus detection signal (B-image signal) for each of colors of R, G, and B based on a light receiving signal (output signal) of the second focus detection pixel for each of colors of R, G, and B included in the focus detection area.

Subsequently, at step S220, the CPU 121 (generation unit 121*a*) performs second pixel addition processing to convert each of the color signals (RGB signals) to a luminance signal (Y signal) for each of the first and second focus detection signals of R, G, and B. As a result, processed first and second focus detection signals are generated.

Figure 12:
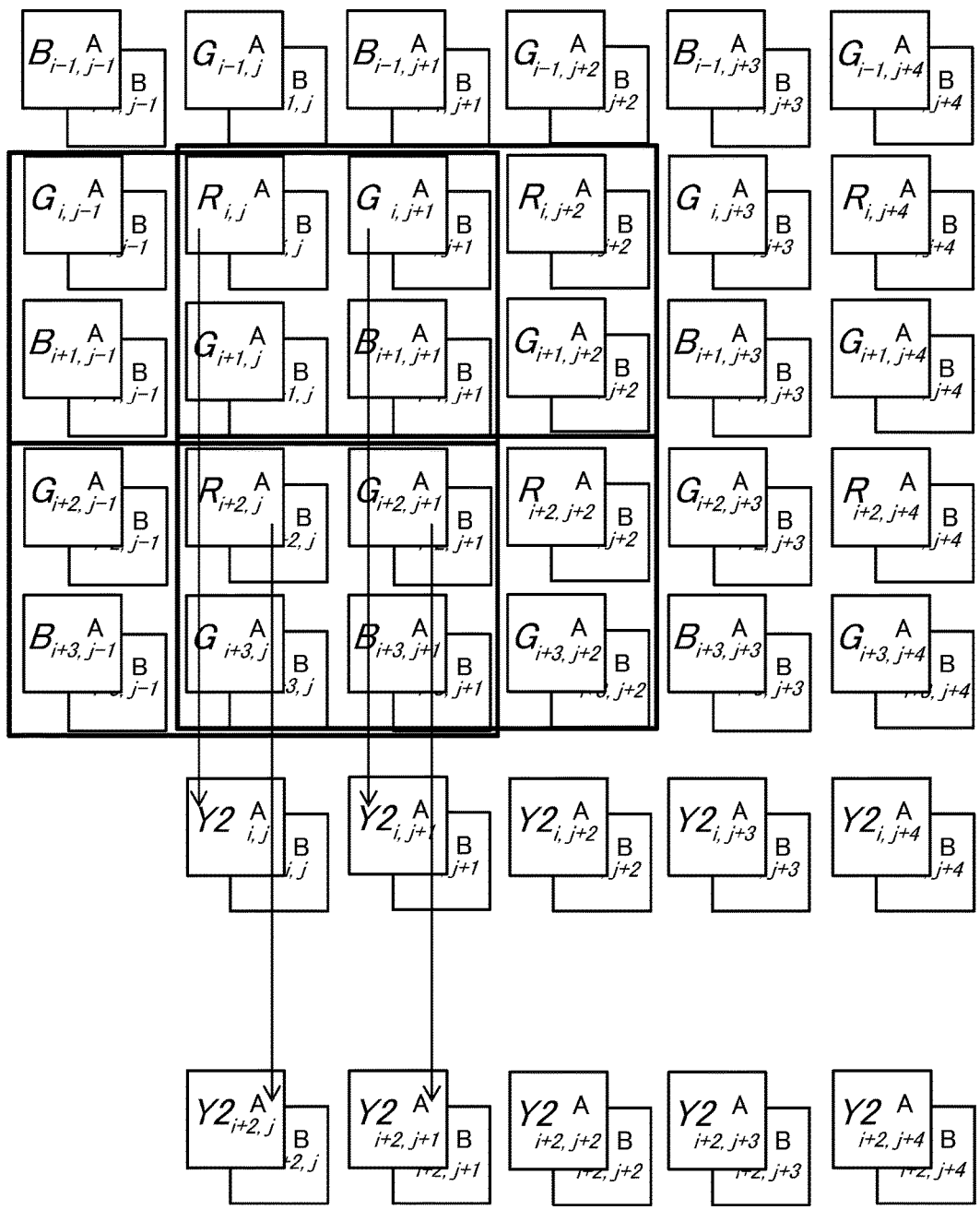
FIG. 12 is an explanatory diagram of second pixel addition processing in Embodiment 1.

Referring to FIG. 12, second pixel addition processing in this embodiment will be described. FIG. 12 is an explanatory diagram of the second pixel addition processing. In FIG. 12, the first focus detection signal at j-th in a column direction (pupil division direction) and at i-th in a row direction (direction orthogonal to the pupil division direction) in Bayer array is represented by A (i, j). The first focus detection signal is indicated for each of colors of R, G, and B. The first focus detection signal of R (first color) is represented by RA(i, j)=A (i,j). The first focus detection signal of G (second color) is represented by GA(i,j+1)=A (i,j+1) and GA(i+1,j)=A(i+1,j). The first focus detection signal of B (third color) is represented by BA(i+1,j+1)=A (i+1,j+1). Similarly, the second focus detection signal at j-th in the column direction (pupil division direction) and at i-th in the row direction (direction orthogonal to the pupil division direction) in the Bayer array is represented by B (i, j). The second focus detection signal is also indicated for each of colors of R, G, and B. The second focus detection signal of R (first color) is represented by RB (i, j)=B (i,j). The second focus detection signal of G (second color) is represented by GB (i, j+1)=B (i, j+1) and GB (i+1,j)=A (i+1,j). The second focus detection signal of B (third color) is represented by BB (i+1, j+1)=B (i+1, j+1).

According to the second pixel addition processing at step S220 in FIG. 11, as represented by expression (3A) below, a first focus detection signal Y2A(i,j) as a Y signal, i.e., first luminance signal, can be calculated based on the first focus detection signal A(i,j) of the Bayer array. Similarly, according to the second pixel addition processing, as represented by expression (3B) below, a second focus detection signal Y2B(i,j) as a Y signal, i.e., second luminance signal, can be calculated based on the second focus detection signal B(i,j) of the Bayer array.

$$Y2A(i, j) = \begin{pmatrix} A(i, j-1) & A(i, j) & A(i, j+1) \\ A(i+1, j-1) & A(i+1, j) & A(i+1, j+1) \end{pmatrix} \begin{pmatrix} \frac{1}{8} & \frac{1}{8} \\ \frac{2}{8} & \frac{2}{8} \\ \frac{1}{8} & \frac{1}{8} \end{pmatrix}, \quad (3A)$$

$$= \begin{cases} \frac{1}{8}[GA(i, j-1) + 2RA(i, j) + \\ GA(i, j+1) + BA(i+1, j-1) + \\ 2GA(i+1, j) + BA(i+1, j+1)], & j = 2n, \\ \frac{1}{8}[RA(i, j-1) + 2GA(i, j) + \\ RA(i, j+1) + GA(i+1, j-1) + \\ 2BA(i+1, j) + GA(i+1, j+1)], & j = 2n+1. \end{cases}$$

$$Y2B(i, j) = \begin{pmatrix} B(i, j-1) & B(i, j) & B(i, j+1) \\ B(i+1, j-1) & B(i+1, j) & B(i+1, j+1) \end{pmatrix} \begin{pmatrix} \frac{1}{8} & \frac{1}{8} \\ \frac{2}{8} & \frac{2}{8} \\ \frac{1}{8} & \frac{1}{8} \end{pmatrix}, \quad (3B)$$

$$= \begin{cases} \frac{1}{8}[GB(i, j-1) + 2RB(i, j) + \\ GB(i, j+1) + BB(i+1, j-1) + \\ 2GB(i+1, j) + BB(i+1, j+1)], & j = 2n, \\ \frac{1}{8}[RB(i, j-1) + 2GB(i, j) + \\ RB(i, j+1) + GB(i+1, j-1) + \\ 2BB(i+1, j) + GB(i+1, j+1)], & j = 2n+1. \end{cases}$$

In expressions (3A) and (3B), i=2m and j=2n or 2n+1 (m and n are integers) are satisfied.

As to j=2n in expression (3A), a color centroid (i, j) of 2RA (i, j) of R (first color) and a color centroid (i, j) of GA (i, j−1)+GA(i, j+1) of G (second color) are combined so that color centroids of respective colors in the pupil division direction (column direction) coincide with each other. Furthermore, a color centroid (i+1, j) of 2GA(i+1, j) of G (second color) and a color centroid (i+1, j) of BA(i+1, j−1)+BA(i+1, j+1) of B (third color) are also combined so that color centroids of respective colors in the pupil division direction (column direction) coincide with each other. At the same time, the centroids are combined so that a ratio of colors of R (first color): G (second color): B (third color) is 1:2:1.

As to j=2n+1 in expression (3A), a color centroid (i, j+1) of RA(i,j)+RA(i,j+2) of R (first color) and a color centroid (i, j+1) of 2GA (i, j+1) of G (second color) are combined so that color centroids of respective colors in the pupil division direction (column direction) coincide with each other. Furthermore, a color centroid (i+1,j+1) of GA (i+1,j)+GA (i+1, j+2) of G (second color) and a color centroid (i+1,j+1) of 2BA(i+1,j+1) of B (third color) are also combined so that color centroids of respective colors in the pupil division direction (column direction) coincide with each other. At the same time, the centroids are combined so that a ratio of colors of R (first color) : G (second color) : B (third color) is 1:2:1. As described above, the color centroids are combined to coincide with each other with a predetermined color ratio, and the same is true of expression (3B).

As described above, in the second pixel addition processing, the focus detection signal as a Y signal is generated from the focus detection signal of the Bayer array so that a ratio of colors of R (first color), G (second color), and B (third color) is 1:2:1 in all pixels and centroids of the respective colors in the pupil division direction coincide with each other. Accordingly, in the second focus detection process, the signal period of the focus detection signal as the Y signal in the column direction (pupil division direction) is equal to the signal period of the focus detection signal of the Bayer array in the column direction (pupil division direction) at equal intervals. As a result, a high spatial frequency band can be detected.

On the other hand, if the centroids of the respective colors in the pupil division direction do not coincide with each other, the periods of the respective colors have unequal intervals, and accordingly stabilization using a low-pass filter is necessary and it is difficult to detect the high spatial frequency band stably.

In the second focus detection process of this embodiment, a signal period of the focus detection signal as a Y signal in the pupil division direction is equal to a signal period of a signal period of the focus detection signal of the Bayer array in the pupil division direction, and it is smaller than a signal period of the focus detection signal as a Y signal in the pupil division direction for the first focus detection. The generation unit 121a synthesizes (combines) the signal of the first focus detection pixel of the first color with the signal of the first focus detection pixel of the second color so that the centroids of the colors in the pupil division direction coincide with each other for each pixel to generate the first focus detection signal. Furthermore, the generation unit 121a synthesizes (combines) the signal of the second focus detection pixel of the first color with the signal of the second focus detection pixel of the second color so that the centroids of the colors in the pupil division direction coincide with each other for each pixel to generate the second focus detection signal. In the second focus detection process of this embodiment, in order to perform the focus detection stably from a small defocus state to a neighborhood of a best in-focus position, the second pixel addition processing is performed so that the signal period of the focus detection signal in the pupil division direction decreases and a spatial frequency band of the focus detection signal is heightened.

Subsequently, at step S230, the CPU 121 and the image processing circuit 125 perform shading correction processing (optical correction processing) for each of the first and second focus detection signals. In this case, the CPU 121 generates a first shading correction coefficient of the first focus detection signal and a second shading correction coefficient of the second focus detection signal according to an image height of the focus detection area, an F number of the imaging lens (imaging optical system), and an exit pupil distance. Then, the CPU 121 (image processing circuit 125) multiplies the first focus detection signal by the first shading correction coefficient and multiplies the second focus detection signal by the second shading correction coefficient to perform the shading correction processing (optical correction processing) on the first and second focus detection signals.

When performing the second focus detection by the phase difference detection method, the CPU 121 detects (calculates) the defocus amount (second defocus amount) based on the correlation (degree of coincidence) between the first and second focus detection signals. When the shading by the pupil shift occurs, the correlation (degree of coincidence) between the first and second focus detection signals may be decreased. Therefore, in this embodiment, when performing the second focus detection by the phase-difference detection method, it is preferred that the CPU 121 performs the shading correction processing (optical correction processing) in order to improve the correlation (degree of coincidence) between the first and second focus detection signals to improve a focus detection performance.

Subsequently, at step S240, the CPU 121 and the image processing circuit 125 perform second filtering processing on the first and second focus detection signals. FIG. 10 is an explanatory diagram of the second filtering processing, and it illustrates an example of a passband, with a solid line, in the second filtering processing of this embodiment. In this embodiment, the focus detection from a small defocus state to a neighborhood of a best in-focus position is performed by the second focus detection of the phase difference detection method. Accordingly, the passband in the second filtering processing includes a high frequency band. If necessary, in performing the focusing from the small defocus state to the neighborhood of the best in-focus position, the passband of the second filtering processing during the second focus detection process may be adjusted according to the defocus state. As an example of adjusting the passband, there is horizontal addition or decimation (thinning) of signals or the like.

Subsequently, at step S250, the CPU 121 (calculation unit 121b) performs second shift processing in which the first focus detection signal and the second focus detection signal which are obtained as a result of the second filtering processing are relatively shifted in the pupil division direction. Then, the CPU 121 calculates a second correlation amount (second evaluation value) that represents a degree of coincidence of the signals.

In this embodiment, for j-th in the column direction (pupil division direction) and i-th in the row direction (direction orthogonal to the pupil division direction), first and second focus detection signals in which the second filtering processing has been performed are denoted by dY2A(i,j) and dY2B(i,j), respectively. A range of the number j corresponding to the focus detection area is denoted by W, and a range of the number i is denoted by L. A shift amount by the second shift processing is denoted by $s_2$, and a shift range of the shift amount $s_2$ is denoted by $\Gamma 2$. In this case, correlation amounts $COR2_{even}$ and $COR2_{odd}$ (second evaluation values) are represented by expressions (4A) and (4B) below.

$$COR2_{even}(s_2) = \sum_{i \in L}\sum_{j \in W} |dY2A(i, j+s_2) - dY2B(i, j-s_2)|, s_2 \in \Gamma 2 \quad (4A)$$

-continued $$COR2_{odd}(s_2) = \sum_{i \in L} \sum_{j \in W} |dY2A(i, j+s_2) - dY2B(i, j-s_2)|, s_2 \in \Gamma2 \quad (4B)$$

When calculating the second correlation amount $COR2_{even}$, with respect to the shift amount $s_2$ for each i row, the CPU 121 relates (j+$s_2$)-th first focus detection signal dY2A(i, j+$s_2$) in the column direction to (j−$s_2$)-th second focus detection signal dY2B (i, j−$s_2$) in the column direction to perform subtraction of them to generate a shift subtraction signal. Then, the CPU 121 calculates an absolute value of the generated shift subtraction signal and obtains a sum of the numbers j within a range W corresponding to the focus detection area to calculate a second correlation amount $COR2_{even}$(i, $s_2$) for i row. Furthermore, the CPU 121 obtains a sum of the numbers i within a range L corresponding to the focus detection area for the second correlation amount $COR2_{even}$(i, $s_2$) for each shift amount to calculate a second correlation amount $COR2_{even}$ ($s_2$).

When calculating the second correlation amount $COR2_{odd}$, with respect to the shift amount $s_2$ for each i row, the CPU 121 relates (j+$s_2$)-th first focus detection signal dY2A(i, j+$s_2$) in the column direction to (j−$s_2$)-th second focus detection signal dY2B(i, j−1−$s_2$) in the column direction to perform subtraction of them to generate a shift subtraction signal. Then, the CPU 121 calculates an absolute value of the generated shift subtraction signal and obtains a sum of the numbers j within a range W corresponding to the focus detection area to calculate a second correlation amount $COR2_{odd}$(i, $s_2$) for i row. Furthermore, the CPU 121 obtains a sum of the numbers i within a range L corresponding to the focus detection area for the second correlation amount $COR2_{odd}$(i, $s_2$) for each shift amount to calculate a second correlation amount $COR2_{odd}$($s_2$). In this embodiment, the second correlation amount $COR2_{odd}$ is a correlation amount where the shift amount between the first focus detection signal and the second focus detection signal is shifted by a half phase relative to the second correlation amount $COR2_{even}$.

Subsequently, at step S260, the CPU 121 (calculation unit 121b) performs a subpixel calculation for each of the second correlation amounts $COR2_{even}$ and $COR2_{odd}$ (second evaluation values) to calculate a real-valued shift amount which indicates minimum second correlation amounts and average them to obtain the image shift amount p2. Then, the CPU 121 can calculate the subpixel with high accuracy by calculating the image shift amount p2 based on the two second correlation amounts $COR2_{even}$ and $COR2_{odd}$ whose phases are shifted by half from each other. The CPU 121 multiplies the image shift amount p2 by a second conversion coefficient K2 according to the image height of the focus detection area, the F number of the imaging lens (imaging optical system), and the exit pupil distance to detect (calculate) a second defocus amount Def2.

As described above, in the second focus detection process, the focus detection signal as a Y signal is generated from the focus detection signal of the Bayer array so that a ratio of colors of R (first color), G (second color), and B (third color) is 1:2:1 in all pixels and centroids of the respective colors in the pupil division direction coincide with each other. Accordingly, in the second focus detection process, the signal period of the focus detection signal as the Y signal in the column direction (pupil division direction) is equal to the signal period of the focus detection signal of the Bayer array in the column direction (pupil division direction) at equal intervals. As a result, a high spatial frequency band can be detected.

According to the second focus detection process in this embodiment, a difference between the spatial frequency band of the focus detection signal and the spatial frequency band of the imaging signal for generating the captured image can be reduced, and as a result, it is possible to reduce a difference between the detected in-focus position calculated based on the focus detection signal and the best in-focus position of the imaging signal. Thus, according to the second focus detection process in this embodiment, the focus detection from the small defocus state to a neighborhood of the best in-focus position can be performed with high accuracy.

Figure 13:
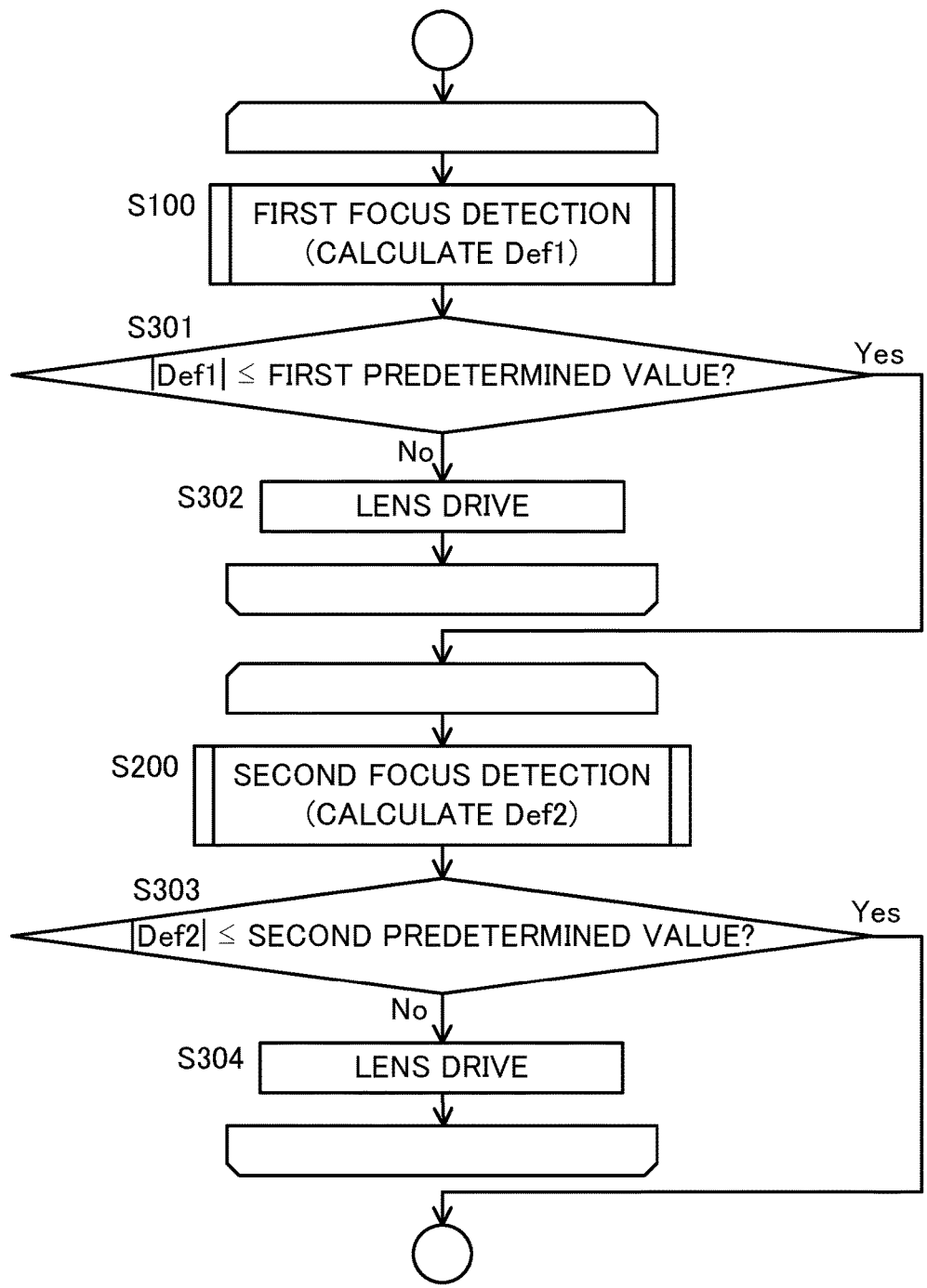
FIG. 13 is a flowchart of illustrating focus control in each embodiment.

Next, referring to FIG. 13, focus control in this embodiment will be described. FIG. 13 is a flowchart of illustrating the focus control. Each step in FIG. 13 is performed mainly by the CPU 121 (generation unit 121a, calculation unit 121b, and focus control unit 121c). The CPU 121 performs the first focus detection until an absolute value of a defocus amount of the imaging optical system is not larger than a first predetermined value to drive (i.e., perform lens drive) the third lens unit 105 (focus lens unit) for focusing from a large defocus state to a small defocus state of the imaging optical system. Then, it performs the second focus detection until the absolute value of the defocus amount of the imaging optical system is not larger than a second predetermined value (first predetermined value>second predetermined value) to perform the lens drive for focusing from the small defocus state to a neighborhood of a best in-focus position of the imaging optical system.

First, at step S100, the CPU 121 detects (calculates) a first defocus amount Def1 by the first focus detection. Subsequently, at step S301, the CPU 121 determines whether or not an absolute value |Def1| of the first defocus amount Def1 calculated at step S100 is smaller than or equal to a first predetermined value. When the absolute value |Def1| of the first defocus amount Def1 is larger than the first predetermined value, the CPU 121 performs the lens drive according to the first defocus amount Def1, and step S100 is repeated. On the other hand, when the absolute value |Def| of the first defocus amount Def1 calculated at step S100 is smaller than or equal to the first predetermined value, the flow proceeds to step S200.

Subsequently, at step S200, the CPU 121 detects (calculates) a second defocus amount Def2 by the second focus detection. At step S303, when an absolute value |Def2| of the second defocus amount Def2 calculated at step S200 is larger than a second predetermined value (first predetermined value>second predetermined value), the CPU 121 performs the lens drive (step S304) according to the second defocus amount Def2, and steps S200 is repeated. On the other hand, when the absolute value |Def2| of the second defocus amount Def2 calculated at step S200 is smaller than or equal to the second predetermined value, the focusing (i.e., focus control in this flow) is finished.

Figure 17:
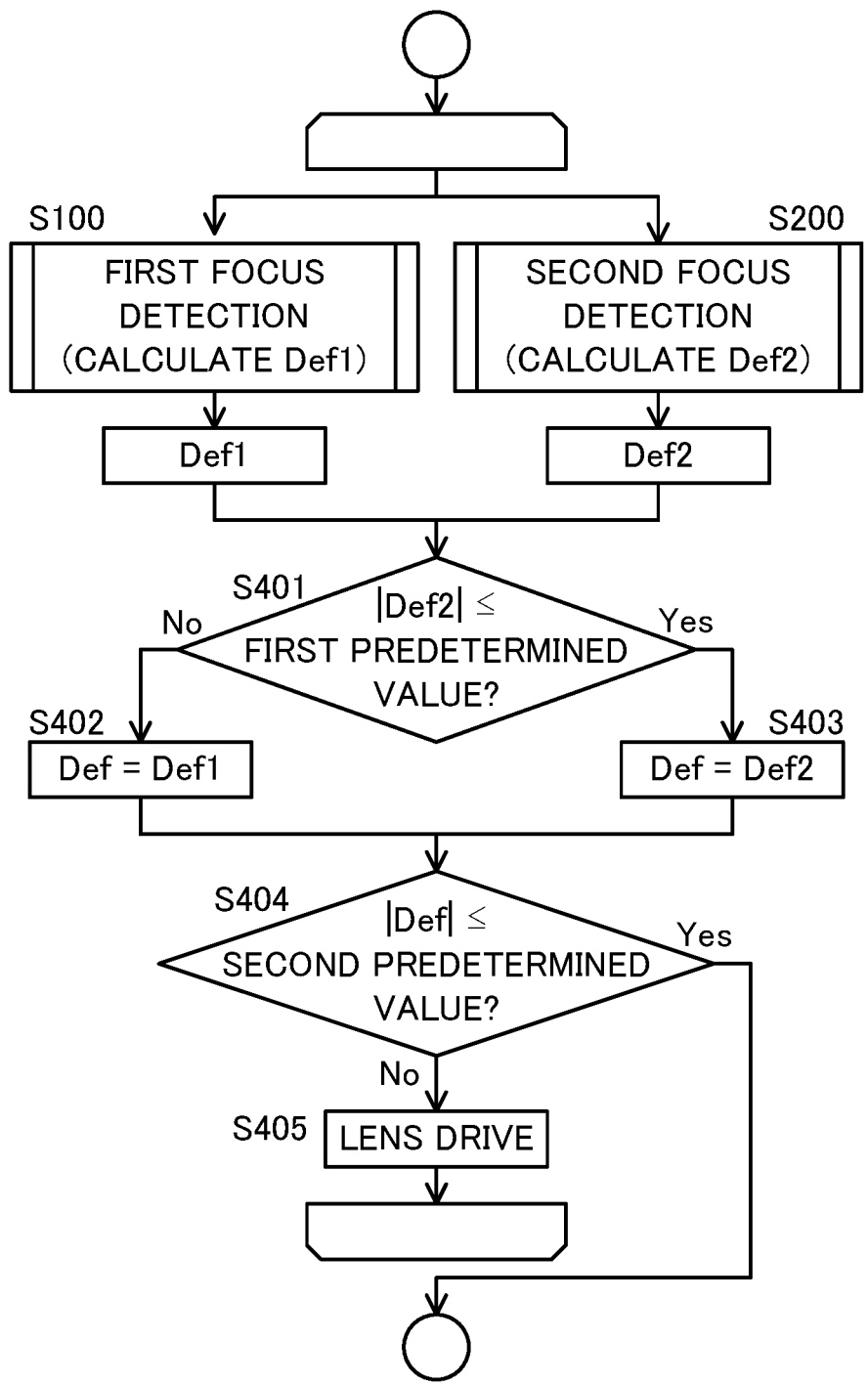
FIG. 17 is a flowchart of illustrating focus control in each embodiment.

The second focus detection is performed after the first focus detection in the flowchart of FIG. 13, but this embodiment is not limited thereto, and both of the first focus detection and the second focus detection may be performed in parallel. FIG. 17 is a flowchart of illustrating the focus control when the first focus detection and the second focus detection are performed in parallel. In FIG. 17, the same symbols are applied with respect to common operations to those in FIG. 13. Each step in FIG. 17 is performed mainly by the CPU 121 (generation unit 121a, calculation unit 121b, and focus control unit 121c).

The CPU 121 performs the first focus detection and the second focus detection. Then, the CPU 121 determines whether or not the absolute value |Def2| of the second defocus amount Def2 of the imaging optical system, which is a result of the second focus detection, is smaller than or equal to a first predetermined value. When the absolute value |Def2| of the second defocus amount Def2 is smaller than or equal to the first predetermined value, the CPU 121 determines whether or not the absolute value |Def1| of the first defocus amount Def1 of the imaging optical system, which is a result of the first focus detection, is smaller than or equal to a second predetermined value. On the other hand, when the second defocus amount Def2 is larger than the first predetermined value, the CPU 121 determines whether or not the absolute value |Def2| of the second defocus amount Def2 of the imaging optical system, which is a result of the second focus detection, is smaller than or equal to the second predetermined value.

First, at step S100, the CPU 121 detects (calculates) the first defocus amount Def1 by the first focus detection. In parallel, at step S200, the CPU 121 detects (calculates) the second defocus amount Def2 by the second focus detection.

Subsequently, at step S401, the CPU 121 determines whether or not the absolute value |Def2| of the second defocus amount Def2 calculated at step S200 is smaller than or equal to the first predetermined value. When the absolute value |Def2| of the second defocus amount Def2 is larger than the first predetermined value, the flow proceeds to step S402, and the CPU 121 adopts the first defocus amount Def1 as a defocus amount Def. On the other hand, when the absolute value |Def2| of the second defocus amount Def2 calculated at step S200 is smaller than or equal to the first predetermined value, the flow proceeds to step S403, and the CPU 121 adopts the second defocus amount Def2 as the defocus amount Def. After step S402 or S403, the flow proceeds to step S404.

Subsequently, at step S404, the CPU 121 determines whether or not the absolute value |Def1| of the defocus amount Def calculated at step S402 or S403 is larger than a second predetermined value (first predetermined value > second predetermined value). When the absolute value |Def1| of the defocus amount Def is larger than the second predetermined value, the flow proceeds to step S405, and the CPU 121 performs the lens drive according to the defocus amount Def. On the other hand, when the absolute value |Def1| of the defocus amount Def is smaller than or equal to the second predetermined value, the focusing (i.e., focus control in this flow) is finished.

According to the second focus detection of this embodiment, in an aperture value F (F number) at a small aperture side, it is possible to perform the focus detection by the phase difference detection method with high accuracy regardless of the defocus state. As the aperture value F increases to be the small aperture, a base length as a centroid interval between the centroid of the partial pupil region 501 and the centroid of the partial pupil region 502 decreases, and a change amount of the image shift amount p with respect to the defocus amount d decreases. Accordingly, in the aperture value F at the small aperture side, the focus detection accuracy may be reduced regardless of the defocus state.

In the second focus detection of this embodiment, a period of the focus detection signal in the column direction (pupil division direction) during the second focus detection is reduced by half relative to a period of the focus detection signal in the column direction (pupil division direction) during the first focus detection. Therefore, the detection accuracy of the image shift amount calculated based on the correlation amount can be increased by two (i.e. can be doubled). According to the second focus detection of this embodiment, in the aperture value F (F number) at the small aperture side, it is possible to perform the focus detection with high accuracy regardless of the defocus state.

According to the image pickup apparatus in this embodiment, a difference between a detected in-focus position based on a focus detection signal and a best in-focus position based on an imaging signal can be reduced to perform focus detection with high accuracy.

[Embodiment 2]

Figure 14:
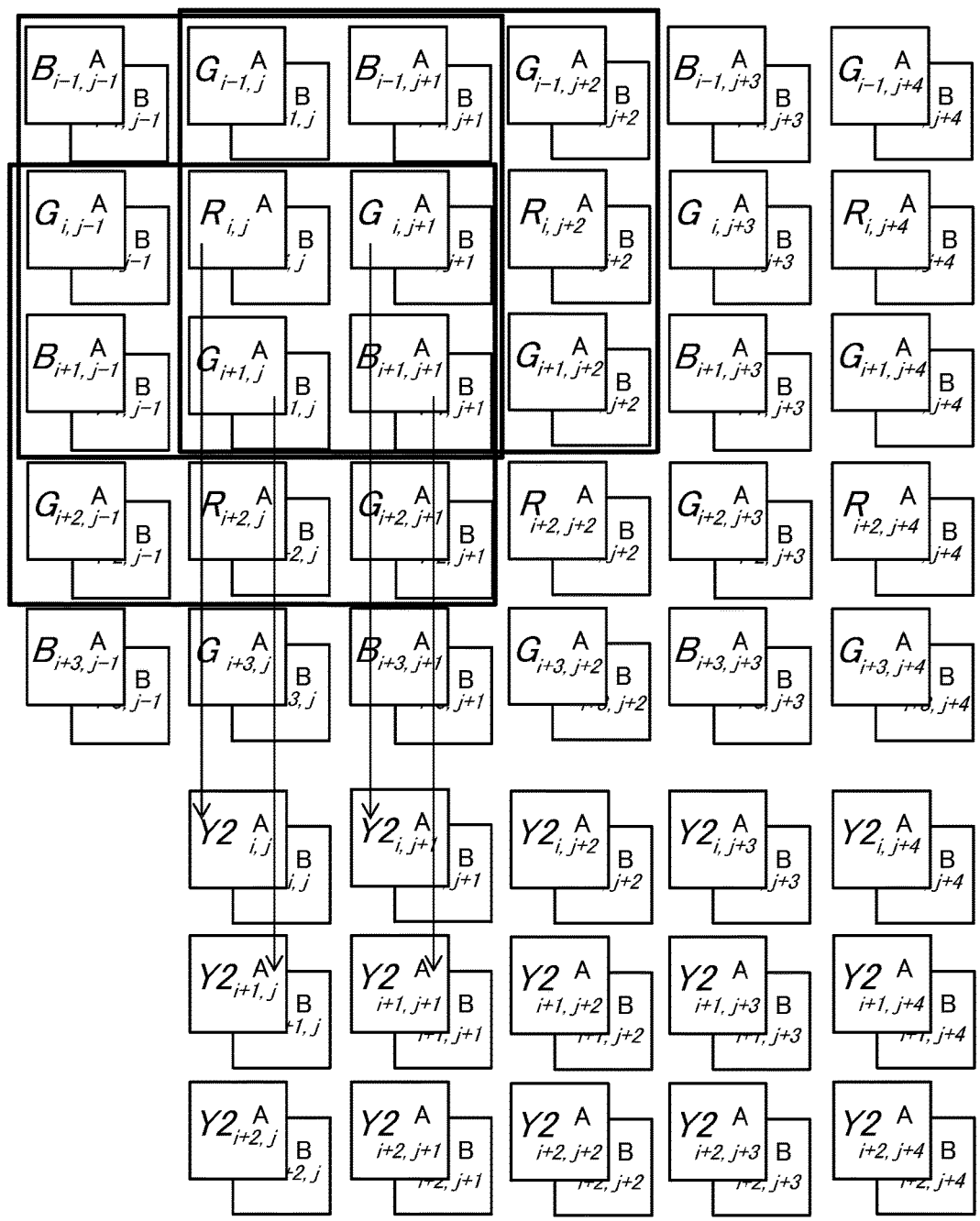
FIG. 14 is an explanatory diagram of second pixel addition processing in Embodiment 2.

Next, referring to FIG. 14, second pixel addition processing in Embodiment 2 of the present invention will be described. FIG. 14 is an explanatory diagram of the second pixel addition processing. This embodiment is different only in the second pixel addition processing from Embodiment 1, and accordingly other descriptions are omitted.

In FIG. 14, the first focus detection signal at j-th in a column direction (pupil division direction) and at i-th in a row direction (direction orthogonal to the pupil division direction) in Bayer array is represented by A (i, j). The first focus detection signal is indicated for each of colors of R, G, and B. The first focus detection signal of R (first color) is represented by RA(i, j)=A (i, j). The first focus detection signal of G (second color) is represented by GA(i,j+1)=A(i,j+1) and GA(i+1,j)=A(i+1,j). The first focus detection signal of B (third color) is represented by BA(i+1,j+1)=A(i+1,j+1). Similarly, the second focus detection signal at j-th in the column direction (pupil division direction) and at i-th in the row direction (direction orthogonal to the pupil division direction) in the Bayer array is represented by B(i,j). The second focus detection signal is also indicated for each of colors of R, G, and B. The second focus detection signal of R (first color) is represented by RB(i,j)=B(i,j). The second focus detection signal of G (second color) is represented by GB(i,j+1)=B(i,j+1) and GB(i+1,j)=A(i+1,j). The second focus detection signal of B (third color) is represented by BB(i+1,j+1)=B(i+1,j+1).

According to the second pixel addition processing at step S220 in FIG. 11, as represented by expression (5A) below, a first focus detection signal Y2A(i,j) as a Y signal, i.e., first luminance signal, can be calculated based on the first focus detection signal A(i,j) of the Bayer array. Similarly, according to the second pixel addition processing, as represented by expression (5B) below, a second focus detection signal Y2B(i,j) as a Y signal, i.e., second luminance signal, can be calculated based on the second focus detection signal B(i,j) of the Bayer array.

$$Y2A(i, j) = \begin{pmatrix} A(i-1, j-1) & A(i-1, j) & A(i-1, j+1) \\ A(i, j-1) & A(i, j) & A(i, j+1) \\ A(i+1, j-1) & A(i+1, j) & A(i+1, j+1) \end{pmatrix} \begin{pmatrix} \frac{1}{16} & \frac{2}{16} & \frac{1}{16} \\ \frac{2}{16} & \frac{4}{16} & \frac{2}{16} \\ \frac{1}{16} & \frac{2}{16} & \frac{1}{16} \end{pmatrix}, \quad (5A)$$

$$Y2B(i, j) = \begin{pmatrix} B(i-1, j-1) & B(i-1, j) & B(i-1, j+1) \\ B(i, j-1) & B(i, j) & B(i, j+1) \\ B(i+1, j-1) & B(i+1, j) & B(i+1, j+1) \end{pmatrix} \begin{pmatrix} \frac{1}{16} & \frac{2}{16} & \frac{1}{16} \\ \frac{2}{16} & \frac{4}{16} & \frac{2}{16} \\ \frac{1}{16} & \frac{2}{16} & \frac{1}{16} \end{pmatrix}. \quad (5B)$$

In expressions (5A) and (5B), i=m and j=n (m and n are integers) are satisfied.

In the second pixel addition processing, the focus detection signal as a Y signal is generated from the focus detection signal of the Bayer array so that a ratio of colors of R (first color), G (second color), and B (third color) is 1:2:1 in all pixels and centroids of the respective colors in the pupil division direction coincide with each other. Accordingly, in the second focus detection process, the signal period of the focus detection signal as the Y signal in the column direction (pupil division direction) is equal to the signal period of the focus detection signal of the Bayer array in the column direction (pupil division direction) at equal intervals. As a result, a high spatial frequency band can be detected.

According to the image pickup apparatus in this embodiment, a difference between a detected in-focus position based on a focus detection signal and a best in-focus position based on an imaging signal can be reduced to perform focus detection with high accuracy.

[Embodiment 3]

Next, referring to FIG. 15 and FIGS. 16A and 16B, an image pickup apparatus in Embodiment 3 of the present invention will be described. This embodiment is different from Embodiment 1 in the pixel array of the image pickup element 107. Other configurations in this embodiment are the same as those in Embodiment 1, and accordingly descriptions thereof are omitted.

FIG. 15 is a diagram of illustrating the pixel array of the image pickup element 107 in this embodiment. FIGS. 16A and 16B are diagrams of illustrating the pixel structure of the image pickup element 107, and FIGS. 16A and 16B illustrate a plan view of a pixel 200G of the image pickup element 107 (view in a +z direction) and a cross-sectional view along a line a-a in FIG. 16A (view in a -y direction), respectively.

FIG. 15 illustrates the pixel array (array of imaging pixels) of the image pickup element 107 (two-dimensional CMOS sensor) in a range of 4 columns×4 rows. In this embodiment, each of the imaging pixels (pixels 200R, 200G, and 200B) includes four subpixels 201, 202, 203, and 204. Therefore, FIG. 15 illustrates the array of the subpixels in a range of 8 columns×8 rows.

As illustrated in FIG. 15, a pixel group 200 of 2 columns×2 rows includes the pixels 200R, 200G, and 200B in a Bayer array. In other words, in the pixel group 200, the pixel 200R having a spectral sensitivity for R (red) is disposed at the upper left, the pixels 200G having a spectral sensitivity for G (green) are disposed at the upper right and at the lower left, and the pixel 200B having a spectral sensitivity for B (blue) is disposed at the lower right. Each of the pixels 200R, 200G, and 200B (each imaging pixel) includes the subpixels 201, 202, 203, and 204 arrayed in 2 columns×2 row. While the example where each pixel includes the subpixels arrayed in 2 columns×2 row is described in this embodiment, each pixel may include more subpixels or may include subpixels whose number is different between the column direction and the row direction. The subpixel 201 is a pixel which receives a light beam passing through a first partial pupil region of the imaging optical system. The subpixel 202 is a pixel which receives a light beam passing through a second partial pupil region of the imaging optical system. The subpixel 203 is a pixel which receives a light beam passing through a third partial pupil region of the imaging optical system. The subpixel 204 is a pixel which receives a light beam passing through a fourth partial pupil region of the imaging optical system.

As illustrated in FIG. 15, the image pickup element 107 includes a number of imaging pixels of 4 columns×4 rows (subpixels of 8 columns×8 rows) arranged on a surface, and it outputs an imaging signal (subpixel signal). In the image pickup element 107 of this embodiment, a period P of the pixels (imaging pixels) is 4 µm, and the number N of the pixels (imaging pixels) is horizontally 5575 columns x vertically 3725 rows=approximately 20.75 million pixels. In the image pickup element 107, a period $P_{SUB}$ of the sub pixels in a column direction is 2 µm, and the number $N_{SUB}$ of the subpixels is horizontally 11150 columns×vertically 7450 rows=approximately 83 million pixels.

As illustrated in FIG. 16B, the pixel 200G of this embodiment is provided with a microlens 305 at a light receiving surface side of the pixel to condense incident light. Each of the microlenses 305 is disposed at a position away from the light receiving surface by a predetermined distance in a z-axis direction (direction of an optical axis direction OA). In the pixel 200G, photoelectric conversion portions 301, 302, 303, and 304 (photoelectric converters) are formed by dividing the pixel into $N_H$ (two divisions) in an x direction and into $N_v$ (two division) in a y direction. The photoelectric conversion portions 301 to 304 correspond to the subpixels 201 to 204, respectively.

In this embodiment, the image pickup element 107 includes the plurality of subpixels that share a single microlens and that receive a plurality of light beams passing through regions (first to fourth partial pupil regions) different from each other in a pupil of the imaging optical system (imaging lens). The image pickup element 107 includes, as the plurality of subpixels, first subpixels (a plurality of subpixels 201), second subpixels (a plurality of subpixels 202), third subpixels (a plurality of subpixels 203), and fourth subpixels (a plurality of subpixels 204).

In this embodiment, signals of the subpixels 201, 202, 203, and 204 are added (combined) and read out for each pixel of the image pickup element 107 so that a captured image with a resolution of the number N of the effective pixels can be generated. As described above, the captured image is generated by synthesizing (combining) light-receiving signals of the plurality of subpixels (subpixels 201 to 204 in this embodiment) for each pixel.

In this embodiment, a first focus detection signal is generated by adding the signals of the subpixels 201 and 203 for each pixel of the image pickup element 107, and a second focus detection signal is generated by adding the signals of the subpixels 202 and 204 for each pixel of the image pickup element 107. In this case, the plurality of subpixels 201 and 203 constitute a first pixel group, and the plurality of subpixels 202 and 204 constitute a second pixel group. According to the addition processing, the first focus detection signal and the second focus detection signal corresponding to the pupil division in the horizontal direction can be acquired, and it is possible to perform first focus detection and second focus detection by the phase difference detection method.

In this embodiment, the first focus detection signal is generated by adding (combining) the signals of the subpixels 201 and 202 for each pixel of the image pickup element 107, and the second focus detection signal is generated by adding (combining) the signals of the subpixels 203 and 204 for each pixel of the image pickup element 107. In this case, the plurality of subpixels 201 and 202 constitute the first pixel group, and the plurality of subpixels 203 and 204 constitute the second pixel group. According to the addition processing, the first focus detection signal and the second focus detection signal corresponding to the pupil division in the vertical direction can be acquired, and it is possible to perform the first focus detection and the second focus detection by the phase difference detection method.

According to the image pickup apparatus in this embodiment, a difference between a detected in-focus position based on a focus detection signal and a best in-focus position based on an imaging signal can be reduced to perform focus detection with high accuracy.

As described above, in each embodiment, the control apparatus (CPU 121) includes the generation unit 121a and the calculation unit 121b. The generation unit 121a generates the first focus detection signal and the second focus detection signal based on the plurality of types of color signals from the first pixel group and the second pixel group that receive light beams passing through partial pupil regions different from each other in the imaging optical system. The calculation unit 121b calculates the defocus amount by the phase difference detection method by using the first focus detection signal and the second focus detection signal. The generation unit 121a combines (i.e., performs pixel addition processing on) the plurality of types of color signals with respect to the first pixel group so that centroids of the color signals in the pupil division direction coincide with each other to generate the first focus detection signal. Furthermore, the generation unit 121a combines the plurality of types of color signals with respect to the second pixel group so that centroids of the color signals in the pupil division direction coincide with each other to generate the second focus detection signal.

Preferably, in the pupil division direction, signal periods of the first focus detection signal and the second focus detection signal are equal to array periods of the first pixel group and the second pixel group, respectively. Preferably, the plurality of types of color signals include a first color signal, a second color signal, and a third color signal. The generation unit 121a combines the first color signal, the second color signal, and the third color signal with respect to the first pixel group so that centroids of the first color signal, the second color signal, and the third color signal in the pupil division direction coincide with each other to generate the first focus detection signal as a first luminance signal (Y2A). Furthermore, the generation unit 121a combines the first color signal, the second color signal, and the third color signal with respect to the second pixel group so that centroids of the first color signal, the second color signal, and the third color signal in the pupil division direction coincide with each other to generate the second focus detection signal as a second luminance signal (Y2B).

Preferably, the first color signal is a signal obtained from a first pixel (for example, RA(i,j) illustrated in FIG. 12) in the first pixel group. The second color signal is a signal obtained from each of a second pixel (GA(i,j−1)), a third pixel (GA(i,j+1)), and a fourth pixel (GA(i+1,j)) that are adjacent to the first pixel in the first pixel group. In this case, each of the centroids of the first color signal and the second color signal in the pupil division direction corresponds to a position of the first pixel. The same is true on the second pixel group. More preferably, the third color signal is a signal obtained from each of a fifth pixel (for example, BA(i+1,j−1) illustrated in FIG. 12) and a sixth pixel (BA(i+1,j+1)) in the first pixel group. In this case, the centroid of the third color signal in the pupil division direction corresponds to the position of the first pixel. The same is true on the second pixel group.

Preferably, the first color signal is a signal obtained from a first pixel (for example, RA(i,j) illustrated in FIG. 14) in the first pixel group. The second color signal is a signal obtained from each of a second pixel (GA(i,j−1)), a third pixel (GA(i,j+1)), a fourth pixel (GA(i+1), j), and a fifth pixel (GA(i−1,j)) that are adjacent to the first pixel in the first pixel group. In this case, each of the centroids of the first color signal and the second color signal in the pupil division direction corresponds to a position of the first pixel. The same is true on the second pixel group. More preferably, the third color signal is a signal obtained from each of a sixth pixel (for example, BA(i−1,j−1) illustrated in FIG. 14), a seventh pixel (BA(i+1,j−1)), an eighth pixel (BA(i−1,j+1)), and a ninth pixel (BA(i+1,j+1)) in the first pixel group. In this case, the centroid of the third color signal in the pupil division direction corresponds to the position of the first pixel. The same is true on the second pixel group.

Preferably, the first color signal, the second color signal, and the third color signal are a red signal, a green signal, and a blue signal, respectively, and each of the first pixel group and the second pixel group has the Bayer array. A ratio of combination of the first color signal, the second color signal, and the third color signal with respect to each of the first focus detection signal and the second focus detection signal is 1:2:1.

Preferably, the control apparatus includes the focus control unit 121c which performs the focus control based on the defocus amount. The focus control unit 121c performs the focus control based on a first defocus amount calculated by the calculation unit 121b in the first focus detection process when the first defocus amount is larger than a first threshold value (first predetermined value). On the other hand, the focus control unit 121c performs the focus control based on a second defocus amount calculated by the calculation unit 121b in the second focus detection process when the first defocus amount is smaller than the first threshold value. Then, in the second focus detection process, the generation unit 121a combines the plurality of types of color signals so that the centroids of the color signals in the pupil division direction coincide with each other to generate the first focus detection signal and the second focus detection signal. More preferably, in the first focus detection process, signal periods of the first focus detection signal and the second focus detection signal generated by the generation unit 121a in the pupil division direction are larger than array periods of the first pixel group and the second pixel group. More preferably, a spatial frequency band of each of the first focus detection signal and the second focus detection signal in the second focus detection process is higher than a spatial frequency band in the first focus detection process.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s), and/or that includes one or more circuits (e.g., application specific integrated circuit (ASIC) IC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each embodiment, a control apparatus, an image pickup apparatus, a control method, and a non-transitory computer-readable storage medium which are capable of reducing a difference between a detected in-focus position based on a focus detection signal and a best in-focus position based on an imaging signal can be provided to perform focus detection with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the control apparatus can perform a control method (image processing method) of acquiring a plurality of detection signals to be used in the phase difference detection method to calculate distance information. This method comprising the steps of performing first processing on viewpoint images (parallax images) including the plurality of types of color signals to acquire a combined signal of the color signals, and performing second processing on the combined signal to generate the detection signal. The first processing combines the color signals so that centroids of the viewpoint images in a viewpoint direction coincide with each other. The first processing includes processing of combining the plurality of types of color signals with a different ratio, and the second processing includes processing of decimation to change a frequency band of a signal included in the combined signal. The control method may further include the step of detecting a phase difference by using the detection signals. In this case, the second processing includes processing on the combined signal based on the detected phase difference. The first processing may include processing of combining the color signals so that centroids of the viewpoint images in a direction perpendicular to the viewpoint direction coincide with each other.

This application claims the benefit of Japanese Patent Application No. 2015-150774, filed on Jul. 30, 2015, and Japanese Patent Application No. 2016-103015, filed on May 24, 2016, which are hereby incorporated by reference herein in their entirety.

What is claimed is:

1. A control apparatus comprising:
one or more processors; and
a memory including instructions stored thereon that, when executed by the one or more processors, cause the control apparatus to:
generate a first focus detection signal and a second focus detection signal based on a plurality of types of color signals from a first pixel group and a second pixel group that receive light beams passing through partial pupil regions different from each other in an imaging optical system; and
calculate a defocus amount by a phase difference detection method by using the first focus detection signal and the second focus detection signal,
wherein the plurality of types of color signals include a red signal, a green signal, and a blue signal,
wherein the instructions that executed by the one or more processors, further cause the control apparatus to:
combine the plurality of types of color signals with respect to the first pixel group so that centroids of the color signals in a pupil division direction coincide with each other to generate the first focus detection signal; and
combine the plurality of types of color signals with respect to the second pixel group so that centroids of the color signals in the pupil division direction coincide with each other to generate the second focus detection signal,
wherein each of the first pixel group and the second pixel group has a Bayer array, and
wherein a ratio of combination of the red signal, the green signal, and the blue signal with respect to each of the first focus detection signal and the second focus detection signal is 1:2:1.

2. The control apparatus according to claim 1, wherein in the pupil division direction, signal periods of the first focus detection signal and the second focus detection signal are equal to array periods of the first pixel group and the second pixel group, respectively.

3. The control apparatus according to claim 1, wherein:
the red signal is a signal obtained from a first pixel in each of the first pixel group and the second pixel group,
the green signal is a signal obtained from each of a second pixel, a third pixel, and a fourth pixel that are adjacent to the first pixel in each of the first pixel group and the second pixel group, and
each of centroids of the red signal and the green signal in the pupil division direction corresponds to a position of the first pixel.

4. The control apparatus according to claim 3, wherein:
the blue signal is a signal obtained from each of a fifth pixel and a sixth pixel in each of the first pixel group and the second pixel group, and
a centroid of the blue signal in the pupil division direction corresponds to the position of the first pixel.

5. The control apparatus according to claim 1, wherein:
the red signal is a signal obtained from a first pixel in each of the first pixel group and the second pixel group,
the green signal is a signal obtained from each of a second pixel, a third pixel, a fourth pixel, and a fifth pixel that are adjacent to the first pixel in each of the first pixel group and the second pixel group, and
each of centroids of the red signal and the green signal in the pupil division direction corresponds to a position of the first pixel.

6. The control apparatus according to claim 5, wherein:
the blue signal is a signal obtained from each of a sixth pixel, a seventh pixel, an eighth pixel, and a ninth pixel in each of the first pixel group and the second pixel group, and
a centroid of the blue signal in the pupil division direction corresponds to the position of the first pixel.

7. The control apparatus according to claim 1, further comprising a focus control unit configured to perform focus control based on the defocus amount,
wherein the focus control unit is configured to:
perform the focus control based on a first defocus amount calculated by the processor in a first focus detection process when the first defocus amount is larger than a first threshold value, perform the focus control based on a second defocus amount calculated by the processor in a second focus detection process when the first defocus amount is smaller than the first threshold value, and wherein in the second focus detection process, the processor is configured to combine the plurality of types of color signals so that the centroids of the color signals in the pupil division direction coincide with each other to generate the first focus detection signal and the second focus detection signal.

8. The control apparatus according to claim 7, wherein in the first focus detection process, signal periods of the first focus detection signal and the second focus detection signal generated by the processor in the pupil division direction are larger than array periods of the first pixel group and the second pixel group.

9. The control apparatus according to claim 7, wherein a spatial frequency band of each of the first focus detection signal and the second focus detection signal in the second focus detection process is higher than a spatial frequency band of each of the first focus detection signal and the second focus detection signal in the first focus detection process, respectively.

10. A control method comprising:
    generating a first focus detection signal and a second focus detection signal based on a plurality of types of color signals from a first pixel group and a second pixel group that receive light beams passing through partial pupil regions different from each other in an imaging optical system; and
    calculating a defocus amount by a phase difference detection method by using the first focus detection signal and the second focus detection signal,
    wherein the plurality of types of color signals include a red signal, a green signal, and a blue signal,
    wherein the step of generating the first focus detection signal and the second focus detection signal includes:
        combining the plurality of types of color signals with respect to the first pixel group so that centroids of the color signals in a pupil division direction coincide with each other to generate the first focus detection signal; and
        combining the plurality of types of color signals with respect to the second pixel group so that centroids of the color signals in the pupil division direction coincide with each other to generate the second focus detection signal,
    wherein each of the first pixel group and the second pixel group has a Bayer array, and
    wherein a ratio of combination of the red signal, the green signal, and the blue signal with respect to each of the first focus detection signal and the second focus detection signal is 1:2:1.

11. A non-transitory computer-readable storage medium which stores a program causing a computer to execute a process comprising:
    generating a first focus detection signal and a second focus detection signal based on a plurality of types of color signals from a first pixel group and a second pixel group that receive light beams passing through partial pupil regions different from each other in an imaging optical system; and
    calculating a defocus amount by a phase difference detection method by using the first focus detection signal and the second focus detection signal,
    wherein the plurality of types of color signals include a red signal, a green signal, and a blue signal,
    wherein the step of generating the first focus detection signal and the second focus detection signal includes:
        combining the plurality of types of color signals with respect to the first pixel group so that centroids of the color signals in a pupil division direction coincide with each other to generate the first focus detection signal; and
        combining the plurality of types of color signals with respect to the second pixel group so that centroids of the color signals in the pupil division direction coincide with each other to generate the second focus detection signal,
    wherein each of the first pixel group and the second pixel group has a Bayer array, and
    wherein a ratio of combination of the red signal, the green signal, and the blue signal with respect to each of the first focus detection signal and the second focus detection signal is 1:2:1.

* * * * *